United States Patent [19]
Kloth et al.

[11] 3,860,739
[45] Jan. 14, 1975

[54] METHOD AND APPARATUS FOR A WIRING SYSTEM UTILIZING WIRING DEVICES

[75] Inventors: James Albert Kloth, St. Petersburg; Stuart L. Parsons, Clearwater, both of Fla.; John Aaron Zimmerman, Jr., Hershey, Pa.; George Henry Vigeant, deceased, late of St. Petersburg, Fla. by Mrs. George Henry Vigeant, executrix

[73] Assignee: AMP Incorporated, Harrisburg, Pa.

[22] Filed: Oct. 26, 1972

[21] Appl. No.: 300,931

Related U.S. Application Data

[63] Continuation-in-part of Ser. No. 168,655, Aug. 3, 1971, abandoned.

[52] U.S. Cl. ............... 174/48, 174/58, 248/27, 339/99 R
[51] Int. Cl. ............................................. H02g 3/12
[58] Field of Search ............... 174/48, 49, 53, 58; 339/96, 97 R, 97 P, 98, 99 R, 122 R, 126 R; 220/3.6, 3.5; 248/27, DIG. 6; 200/168 D

[56] References Cited
UNITED STATES PATENTS

| | | | |
|---|---|---|---|
| 2,892,174 | 6/1959 | Benander | 339/99 R |
| 3,139,314 | 6/1964 | Miller | 339/97 P |
| 3,392,943 | 7/1968 | Baxter | 248/27 |
| 3,662,085 | 5/1972 | Robinson et al. | 339/126 R X |
| 3,723,948 | 3/1973 | Wyatt et al. | 339/99 R |

*Primary Examiner*—J. V. Truhe
*Assistant Examiner*—David A. Tone
*Attorney, Agent, or Firm*—George K. Kita

[57] ABSTRACT

Method and apparatus is provided for a wiring system wherein continuous uncut lengths of insulation covered conductors are bridged between a plurality of point-to-point locations defined by openings in a substrate wallboard, with electrical wiring devices connected to medial portions of the insulation covered conductors and placed in registration within respective openings in the substrate. Each wiring device includes a metal box enclosure latching a cover plate to a corresponding wiring device. Each box enclosure serves as a mounting bracket with adjustable and deformable portions which enlarge the profile of the corresponding wiring device and which further grip the substrate to mount the wiring device within an opening of the substrate. The deformable portions are adjustable for gripping substrates of varying thicknesses. Each wiring device includes an electrical terminal having an insulation slicing electrical contact for electrical connection to one of the insulation covered conductors. The cover includes projecting portions for pressing a medial portion of an insulation covered conductor into electrical engagement with a corresponding insulation slicing contact. The present invention provides a wiring system having wiring devices connected electrically at intervals along the length of a multi-conductor electrical cable having both uninsulated and insulation covered conductors, such cable being typically used in a wiring system of a building or mobile home.

25 Claims, 23 Drawing Figures

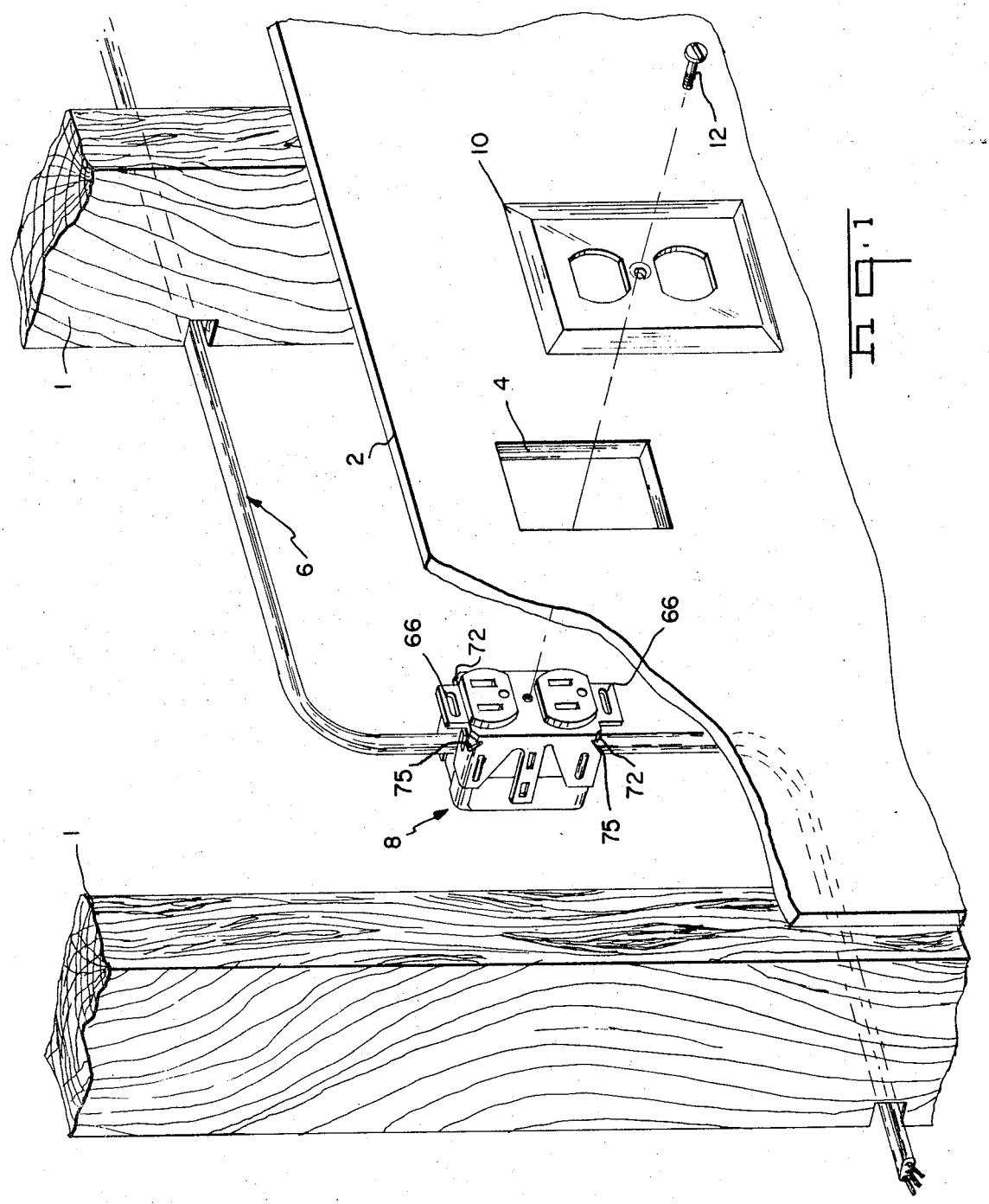

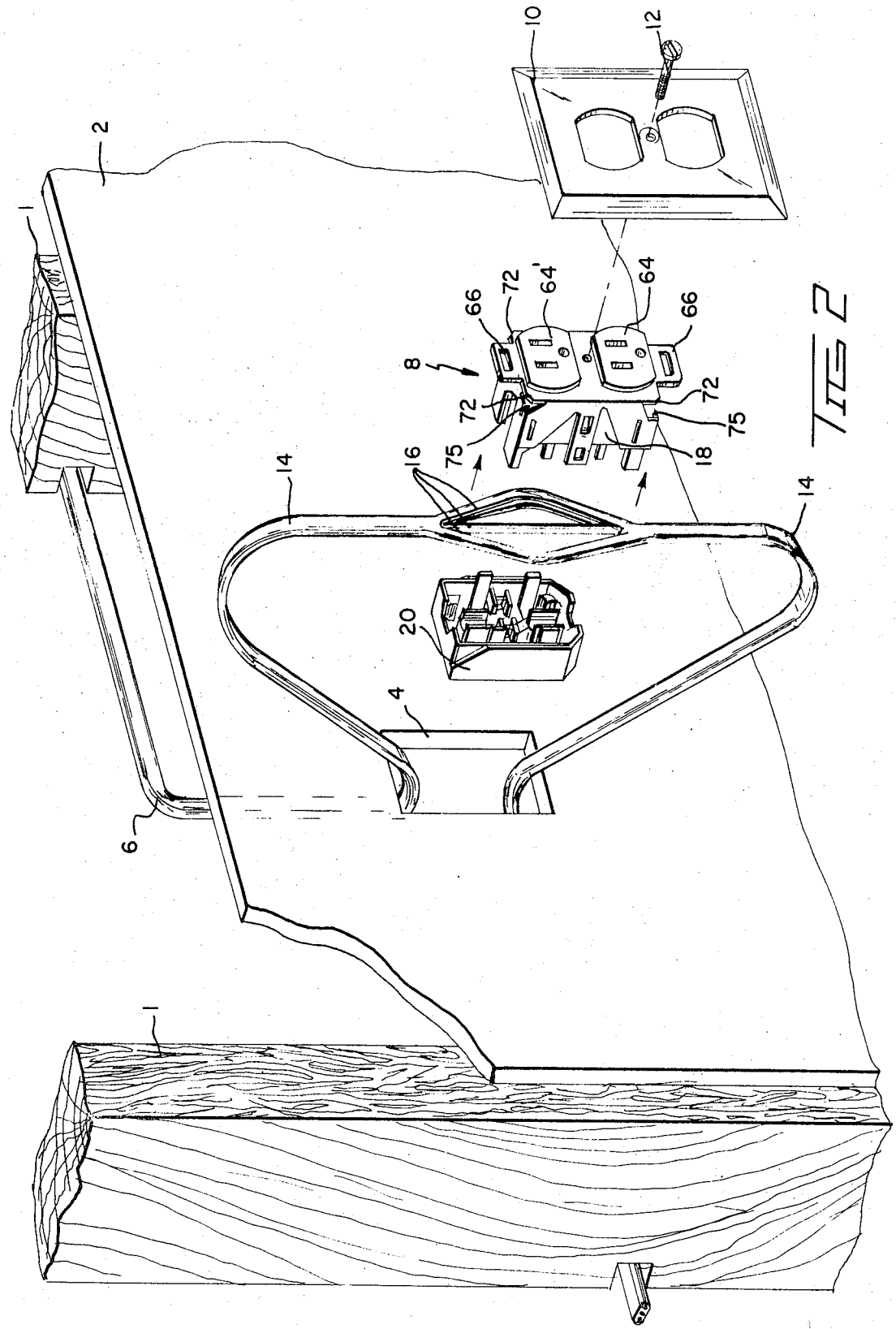

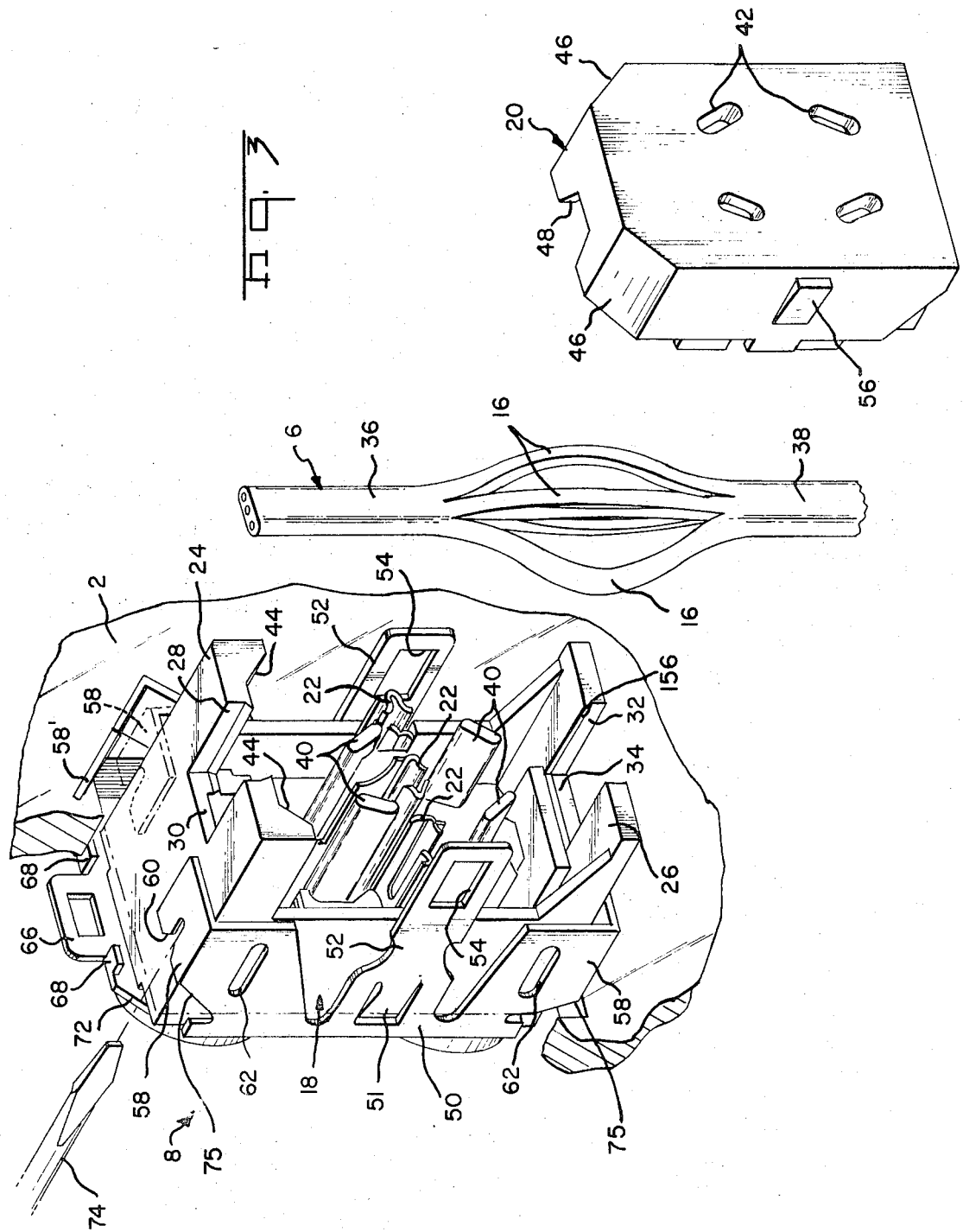

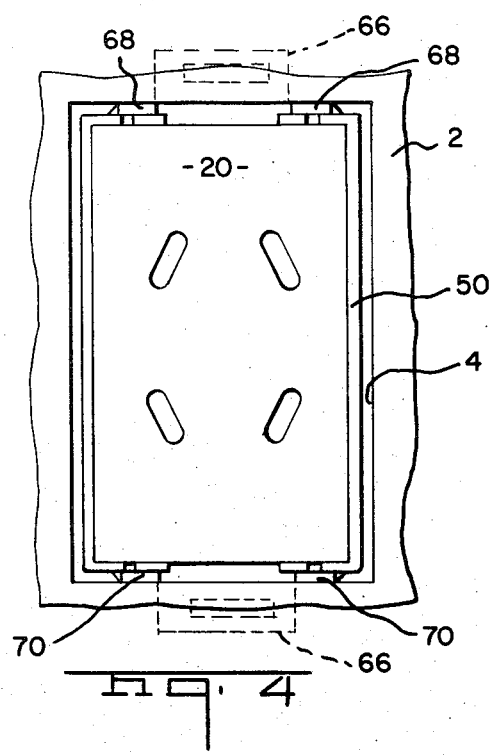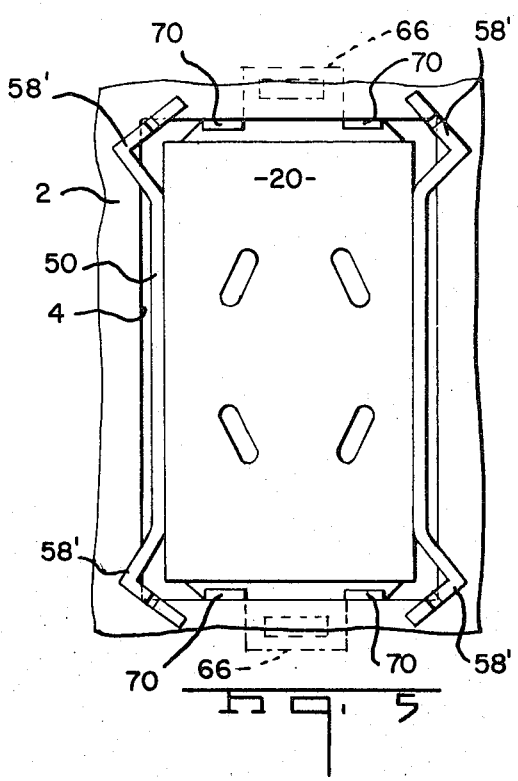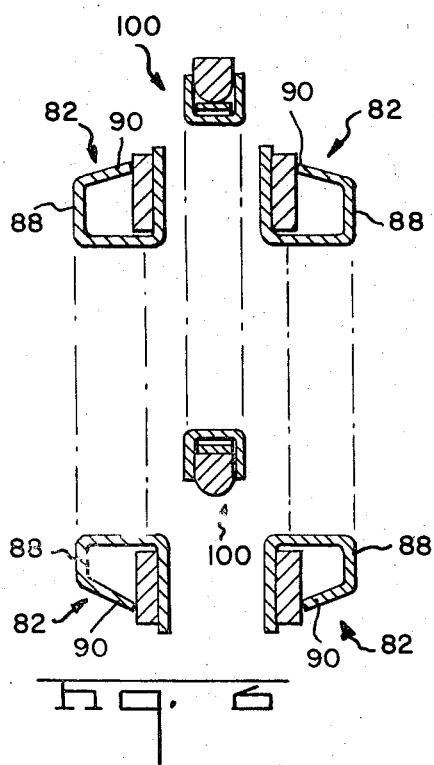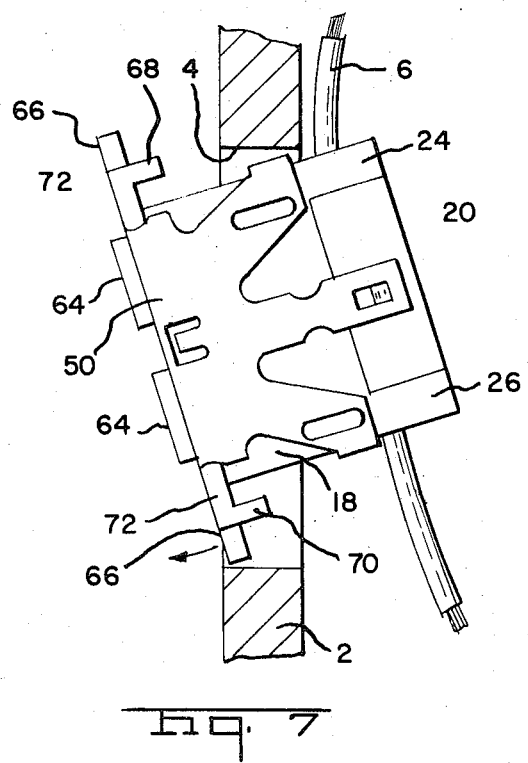

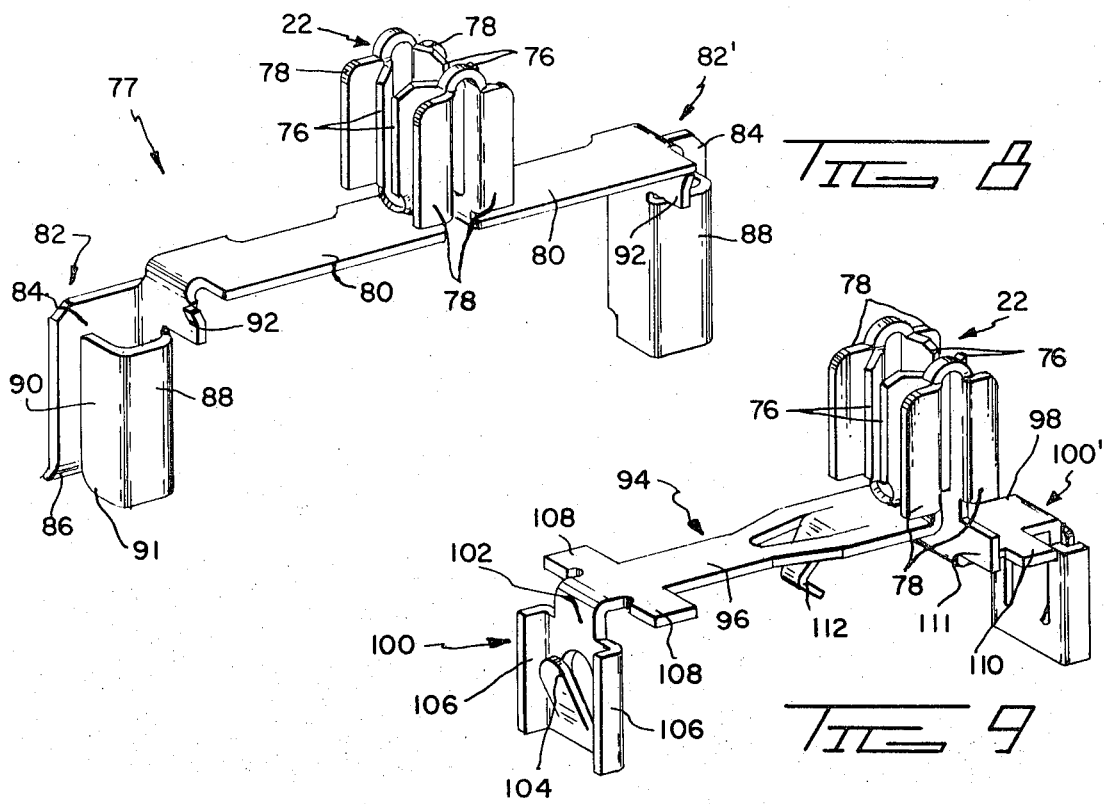
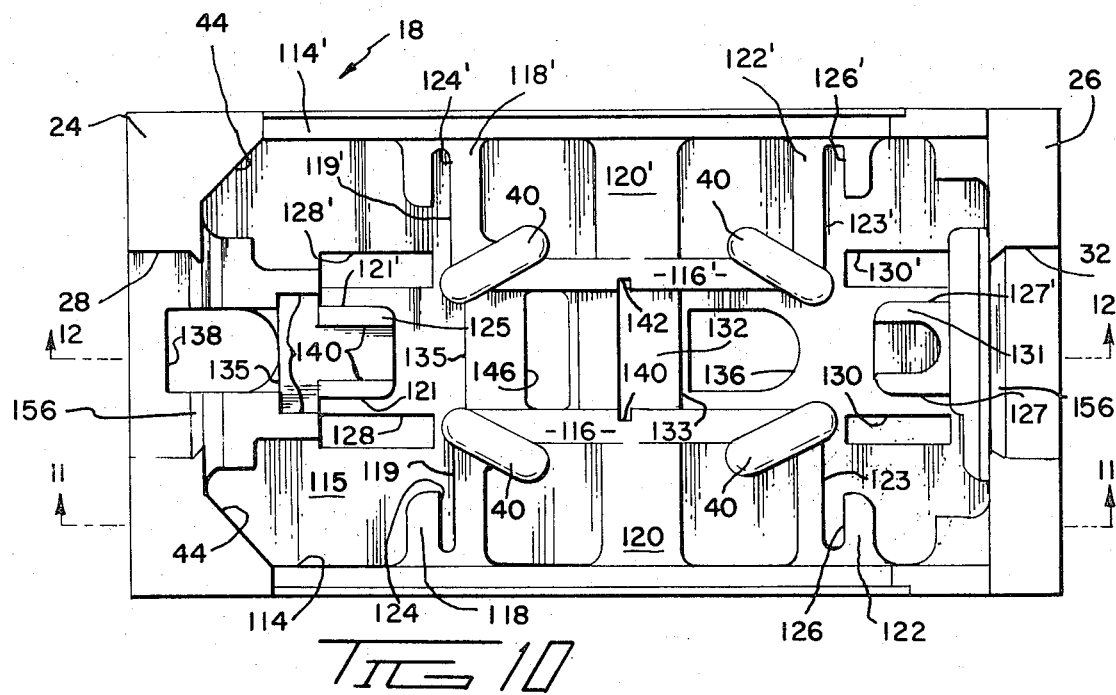

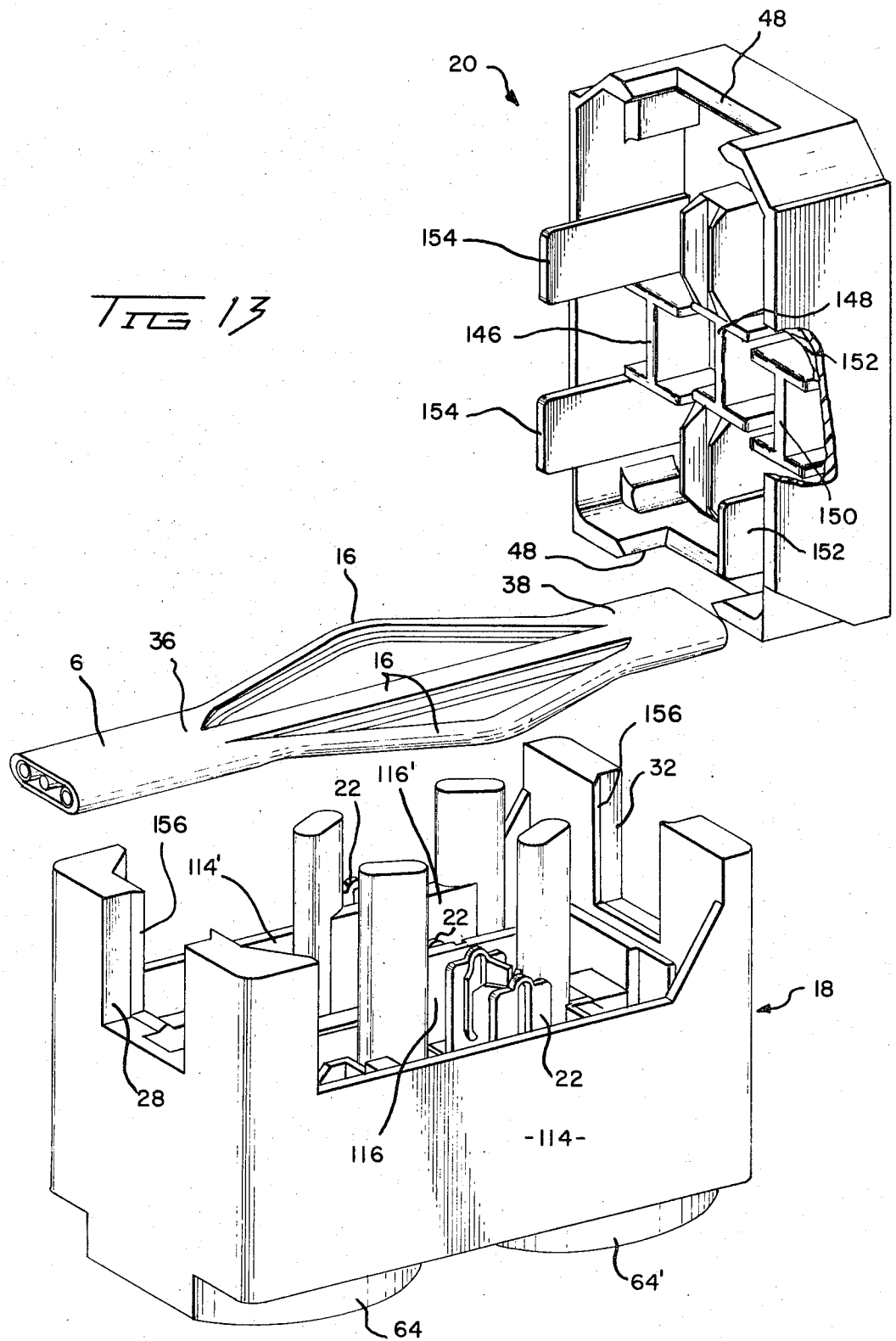

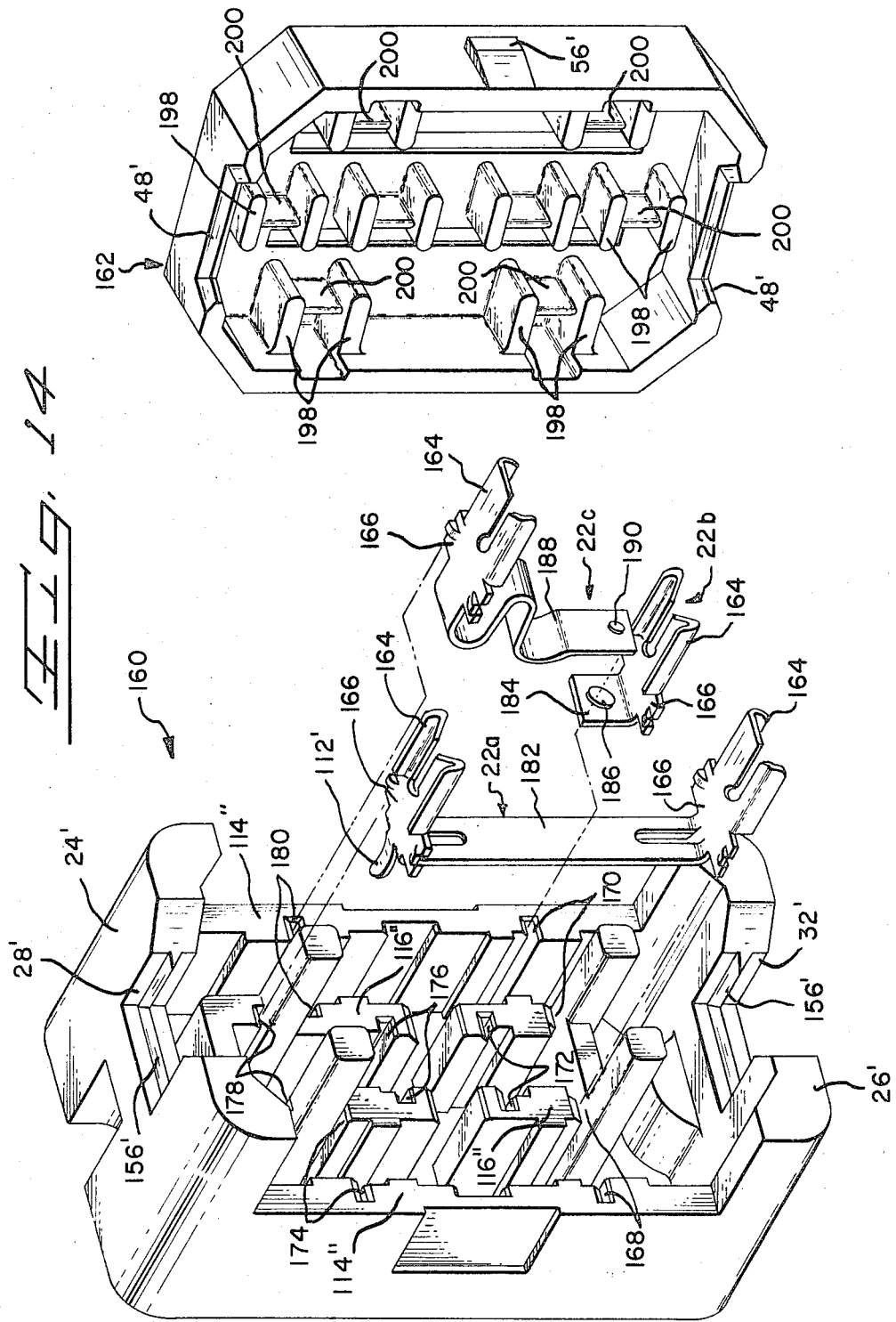

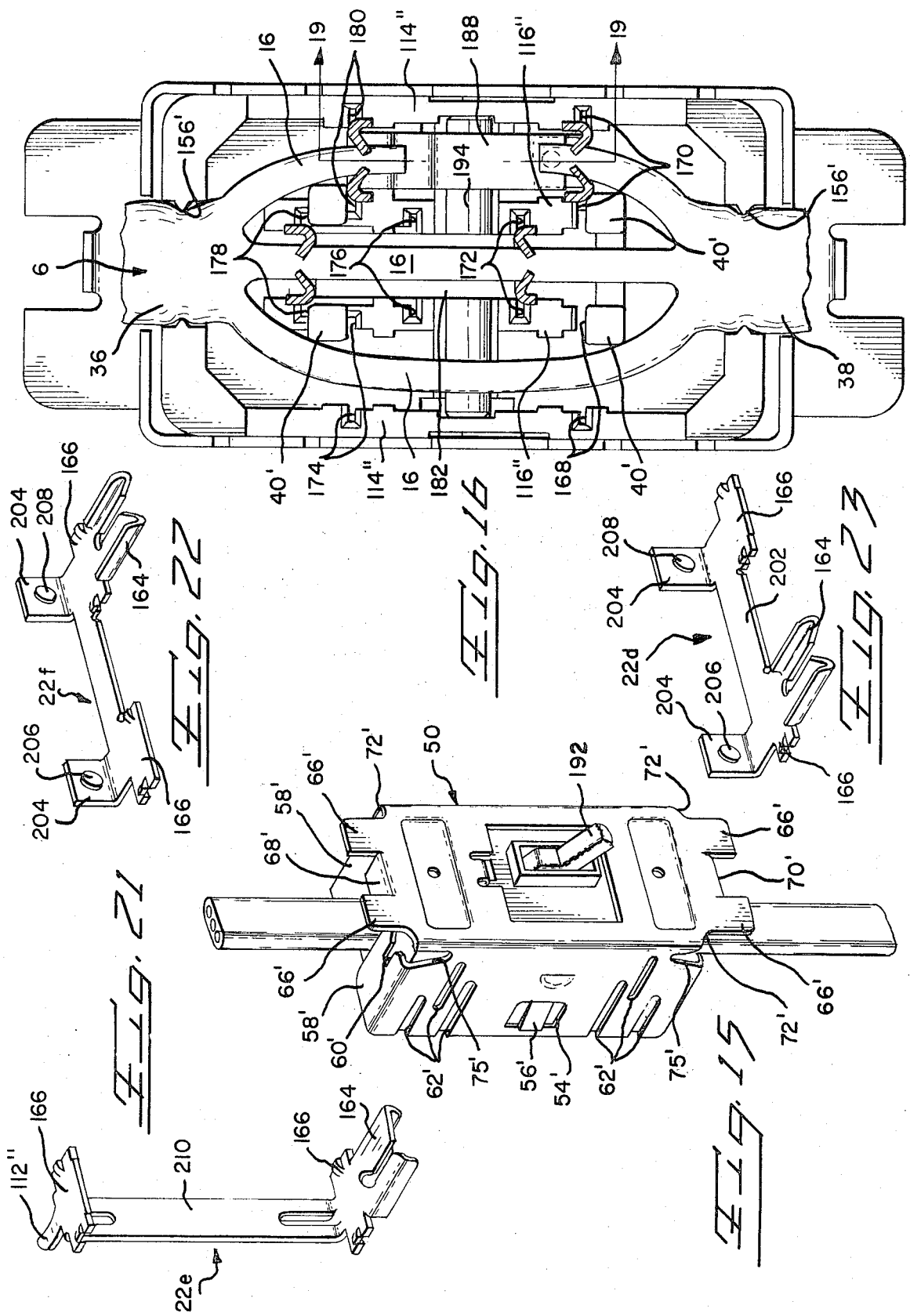

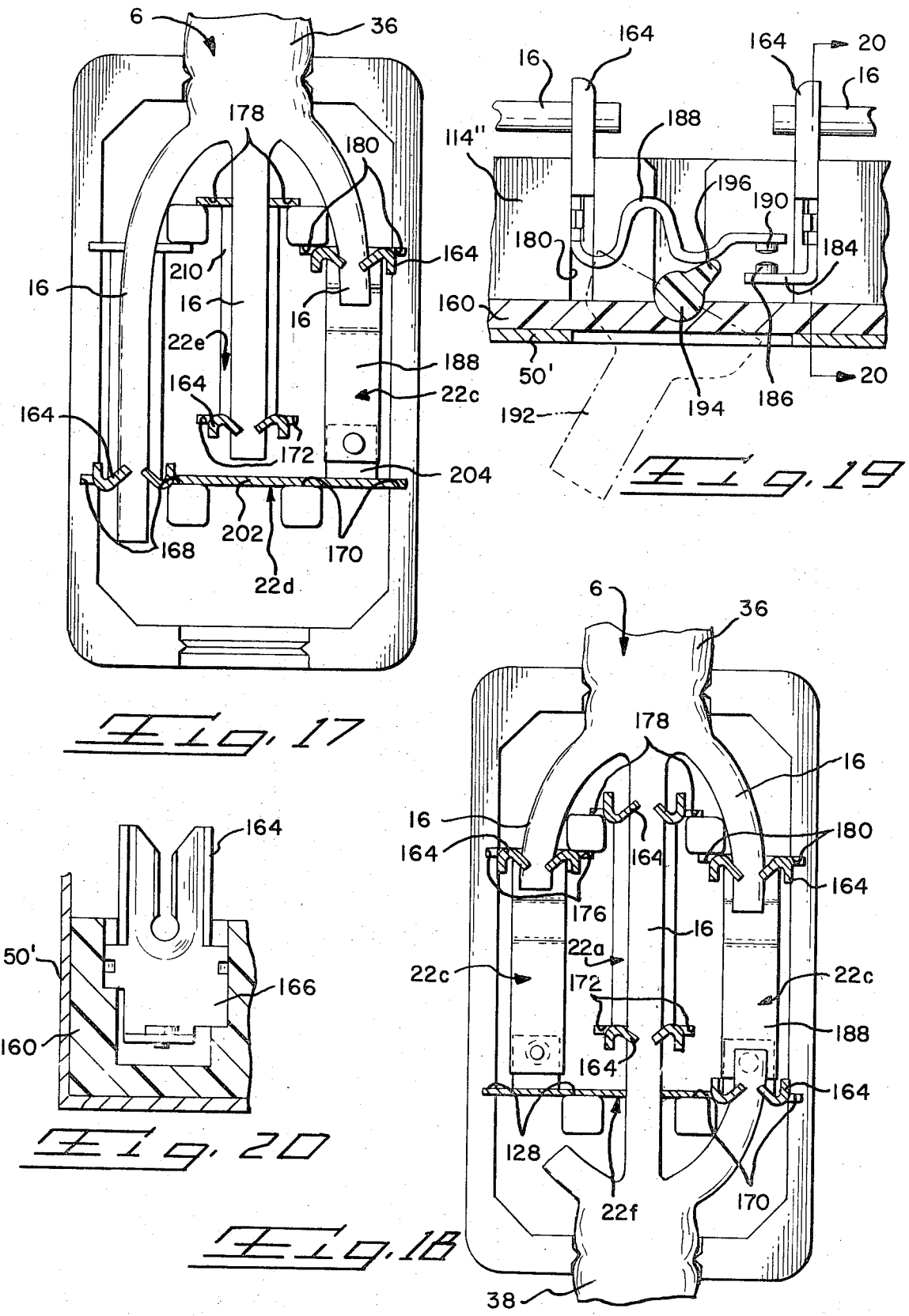

METHOD AND APPARATUS FOR A WIRING SYSTEM UTILIZING WIRING DEVICES

This a continuation-in-part application of Ser. No. 168,655, filed Aug. 3, 1971 in the names of George Henry Vigeant, James Albert Kloth, Stuart L. Parsons and John Aaron Zimmerman, Jr and now abandoned.

The present invention relates to method and apparatus for providing a wiring system utilizing electrical devices and fixtures as well as to specific construction of an electrical device or fixture, such as an outlet receptacle and switch. The present invention is particularly well suited for providing a wiring system having a plurality of wall mounted electrical outlets and switches for supplying electrical power to common household appliances and other electrical machines. The wiring system according to the present invention is readily adapted for incorporation into the wiring system of a building constructed on site or factory assembled utilizing the techniques of modular construction. A salient feature of the present invention resides in a wiring system wherein electrical wiring devices and fixtures such as outlet receptacles and switches are electrically connected at intervals along the length of multi-conductor electrical cable without a need for severing or stripping the insulation from individual conductors of the multi-conductor cable. In the prior art, legislative codes and other wiring regulations and standards require that each electrical wiring device or fixture be mounted within a separate electrically conductive or electrically insulative circuit "outlet box". In the wiring systems according to the prior art, the separate outlet box was first mounted in position near an opening provided in a wallboard. A multi-conductor electrical cable commonly used in wiring systems of buildings, mobile homes, and the like was severed to desired length and fed into the box. The individual conductors of the severed multi-conductor cable were then stripped before electrical connection to a wiring device or fixture, such as an outlet receptacle or switch, for mounting in the "outlet box". The individual severed and stripped conductors of the multi-conductor cable were heretofore electrically connected by wrapping them around individual screws of the wiring device or fixture, with the screws being tightened into gripping relationship on the individual conductors. The wiring device or fixture, and the individual conductors electrically connected thereto, were then required to be stuffed, often with great difficulty, into the "outlet box". The prior art therefore required a separate "outlet box" and wiring device or fixture. The method of fabricating the wiring system was accomplished with relatively large expenditures of time. The screw tightened electrical connections of the individual conductors to the wiring device or fixture were often unreliable, since they depended upon the skill of the operator insuring that the screws were sufficiently tightened, and that the individual conductors were sufficiently wrapped around the screws to make reliable electrical connections. According to the present invention, a unitary combination is formed by an electrical wiring device or fixture and an encircling metal box enclosure. The box enclosure includes a mounting bracket portion mounting the entire unitary combination within an opening provided in a wallboard, thereby eliminating the time consuming procedures of the prior art requiring first an "outlet box" mounted to a wallboard and a wiring device or fixture separately mounted within an "outlet box". In the present invention, the wiring device or fixture is in the form of an electrical outlet receptacle or switch containing insulation slicing and conductor gripping electrical terminals of the slotted plate or notched plate type. Such electrical terminals are insulation slicing and are adapted for electrical connection along medial unsevered and unstripped conductors. Accordingly, the electrical wiring devices or fixtures according to the present invention are readily adapted for providing a wiring system wherein such electrical wiring devices or fixtures are electrically connected at intervals along medial portions of individual conductors which are part of a multi-conductor cable having both uninsulated and insulated conductors, which cable is typically utilized in a wiring system of a building, mobile home or the like. The mere insertion of the individual conductors within the slotted plate or notched plate type electrical terminals assure that reliable electrical connections are made without dependence upon the skill of an operator to insure sufficient screw tightened electrical connections and the need for sufficient wrapping of individual conductors around a screw prior to tightening. The present invention also insures that electrical connections are made quickly by mere insertion of the conductors within corresponding slotted plate or notched plate electrical terminals, thereby eliminating the assembly time required for wrapping conductors around screws and tightening the screws to make comparable electrical connections.

Further according to the present invention, an electrical wiring device or fixture in the form of an outlet receptacle or switch includes a unitary metal box enclosure, the box enclosure further serving to removably latch a cover to a housing portion of the electrical wiring device or fixture containing the individual slotted plate or notched plate electrical terminals therein. A salient feature of the present invention resides in the construction of the housing and cover, which positively locates and retains the individual conductors of the multi-conductor cable in desired positions within the housing containing the individual electrical terminals. An operator then is freed from the necessity of repeatedly adjusting the individual conductors to desired positions in the housing portion. The operator is required merely to assemble the cover over the individual conductors forcibly inserting them into the individual electrical terminals contained in the housing. The box enclosure then receives the cover and latchably retains the cover to the housing thereby containing in the housing the resulting electrical connections of the conductors to the electrical terminals. After the electrical connections are made, the wiring device or fixture and the unitary box enclosure are simultaneously mounted within a substrate opening, thereby eliminating the time consuming procedures of the prior art wherein a "outlet box" is first mounted in position at a wallboard opening and the electrical wiring device or fixture is then electrically connected to the individual conductors and stuffed into the "outlet box". Accordingly, the present invention residing in the unitary combination of a box enclosure and a wiring device or fixture is readily substituted for the prior art "outlet box" and separate wiring device in order to meet the requirements of legislative codes and other regulations and standards pertaining to wiring systems of certain buildings, mobile homes and the like. In addition, the provision of a wiring system utilizing the unitary combination of a box enclosure and a wiring device or fixture can be fabricated in less time by comparison to wiring systems of the prior art and yet produce reliable electrical connections without reliance upon the skill of the operator, which results in further advantages over the wiring systems fabricated according to techniques prevalent in the prior art.

Another salient feature of the present invention resides in a metal enclosure box for a wiring device or fixture, the enclosure box further serving as a mounting bracket. More specifically, the enclosure box includes portions which are outwardly deformable for enlarging the profile thereof and for gripping engagement with the wallboard to which the electrical device or fixture is to be mounted. The deformable portions are also adjustable in order to grip wallboards of varying thicknesses. As a further feature of the present invention, the unitary combination of an electrical wiring device or fixture in an enclosure box is particularly designed for insertion into an opening in a wallboard from either the front or back surface of the wallboard, even when the device or fixture is already electrically connected to the individual conductors of a multi-conductor electrical cable. Even after mounting within an opening of a wallboard, the deformable portions of the mounting bracket are designed to be disengageable from the wallboard to permit removal of the electrical fixture or wiring device from the wallboard for inspection, repair or replacement.

The bracket mounting means is integral with the box enclosure to save parts, manufacturing and assembly time. The housing on which the box enclosure is located includes an aperture through which the box enclosure is directly connected electrically to a selected one of the electrical terminals contained within the housing, thus grounding the box enclosure to the selected terminal receiving the ground conductor of the multi-conductor cable.

The box enclosure is freely inserted through the opening in the wallboard from either side of the wallboard. The opening is of dimensions suitable for freely receiving the box enclosure therethrough. However, when the box enclosure is correctly oriented within the wallboard opening, the dimensions of the opening are such that the integral mounting means of the box enclosure grips on opposite sides of the wallboard thereby mounting the unitary combination of the box enclosure and the wiring device or fixture within the wallboard opening. In addition, the relationship of the size of the wallboard opening to the box enclosure is such that the deformable mounting portions of the box enclosure are exposed through the wallboard opening at each of several locations spaced about the periphery of the box enclosure, insuring that the mounting means of the box enclosure is accessible from either side of the wallboard opening and is not inadvertently hidden or otherwise made inaccessible because of improper location of the box enclosure within the wallboard opening.

It is therefore an object of the present invention to provide a method and apparatus for a wiring system, wherein wiring devices or fixtures such as outlet receptacles and switches are electrically connected at intervals along the length of a multi-conductor electrical cable, with electrical connections being made to the individual conductors of the electrical cable without a need for severing all of the conductors or stripping the insulation from the individual conductors.

It is another object of the present invention to provide a method and apparatus for a wiring system wherein electrical wiring devices or fixtures are electrically connected at selected intervals along the lengths of electrical conductors without a need for cutting all of the conductors or stripping insulation from the insulated ones of the conductors.

Another object of the present invention is to provide a method and apparatus for a wiring system utilizing an outlet receptacle having insulation slicing electrical contacts, with a pair of prong-receiving type electrical contacts electrically connected to each insulation slicing contact.

Another object of the present invention is to provide a method and apparatus for a wiring system incorporating an outlet receptacle and a switch box each having insulation slicing type electrical terminals and a cover plate for pressing medial portions of unstripped electrical conductors into electrical engagement with corresponding insulation slicing terminals.

Another object of the present invention is to provide an outlet receptacle with electrical terminals in the form of a pair of prong-receiving receptacle contacts electrically connected to an insulation slicing type contact having two pairs of cantilever flanges with slicing edges on the flanges.

Another object of the present invention is to provide an outlet receptacle with electrical terminals each in the form of a pair of prong-receiving electrical contacts connected electrically to an insulation slicing type electrical contact.

Another object of the present invention is to provide an electrical wiring device or fixture in the form of an outlet receptacle or a switch provided with a housing and a metal enclosure box in the form of a mounting bracket for latching a cover to the receptacle housing, and with deformable portions on said bracket for enlarging the profile of said bracket and wiring device or fixture.

Another object of the invention is to provide an outlet receptacle and a switch, each having a mounting bracket characterized by a structure enabling insertion of the bracket within an opening in a substrate wallboard from either the front or the back surfaces of the wallboard, with deformable portions on the bracket for enlarging the profile of the respective receptacle and switch, and for gripping substrates of varying thicknesses.

Another object of the present invention is to provide a method for installing a wiring system incorporating an outlet receptacle or a switch having a unitary mounting bracket enabling partial insertion of the receptacle or switch within a substrate opening; further with projecting portions on the bracket for wedging registration of the bracket within the substrate opening; and further with deformable portions on the bracket, for enlarging the profile of the receptacle or switch, and for gripping substrates having different thicknesses.

Another object of the present invention is to provide a method and apparatus for a wiring system having a plurality of wiring devices or fixtures, for example, outlet receptacles and switches, electrically connected at selected intervals along the lengths of individual conductors of a multi-conductor electrical cable, the cable having both uninsulated and insulation covered individual conductors electrically connected to corresponding slotted plate or notched plate type insulation slicing electrical terminals contained within the wiring devices or fixtures.

Another object of the present invention is to provide a method and apparatus for a wiring system utilizing electrical wiring devices or fixtures, for example, outlet receptacles and switches, connected at intervals along the uninsulated and insulated individual conductors of a multiconductor electrical cable, wherein the fixtures or devices include insulation slicing electrical terminals each provided with a pair of gripping and slicing internal edges which slice through the insulation on unstripped insulated conductors and which further electrically and mechanically contact the individual conductors by gripping on opposite sides of the corresponding uninsulated and insulated conductors of the multi-conductor cable.

Another object of the present invention is to provide a method and apparatus for mounting a wiring device or fixture on a multi-conductor electrical cable, inserting the wiring device or fixture into an opening provided in a substrate wallboard from either the obverse or reverse surfaces of the wallboard, and providing a bracket on the device or fixture having deformable portions partially expandable into gripping engagement with the wallboard, such deformable portions being subsequently disengageable from the wallboard allowing removal of the device or fixture through the obverse surface of the wallboard for inspection, repair or replacement.

Another object of the present invention is to provide as a unitary combination, a wiring device or fixture, such as an outlet receptacle or a switch, together with a metal enclosure box enclosing the device or fixture, the enclosure box serving as a circuit "outlet box" receiving the wiring device or fixture in mounted position within a wallboard opening, with the enclosure box further serving as a mounting bracket for mounting the wiring device or fixture within the wallboard opening, and further with the enclosure box and wiring device or fixture combination being qualified for substitution and replacement of a separate wiring device and a separate mounting box heretofore required by certain legislative and other regulatory and standardized wiring codes.

Another object of the present invention is to provide a wiring device or fixture as a unitary combination together with a metal enclosure box which meets the standards set forth for a wiring device and a circuit "outlet box" required in certain legislative and standardized wiring codes, the enclosure box further including structure allowing installation of the enclosure box into a wallboard opening from either the obverse or reverse surfaces of a wallboard, the enclosure box further having adjustable portions thereon for gripping wallboards having various thicknesses in order to mount the wiring device or fixture in the wallboard opening, the adjustable portion further being capable of disengagement from the wallboard to allow removal of an installed wiring device or fixture from the wallboard opening for inspection, repair or replacement.

Another object of the present invention is to provide a bracket for mounting an electrical wiring device or fixture within a wallboard opening, with adjustable portions being provided on the bracket for gripping wallboards having different thicknesses, the adjustable portions further being disengageable from a wallboard allowing removal of the electrical wiring device or fixture from the wallboard opening for the purposes of inspecting, repairing or replacing the device or fixture.

Other objects and many attendant advantages of the present invention will become apparent upon perusal of the following detailed description taken in conjunction with the accompanying drawings, wherein:

FIG. 1 is a fragmentary diagrammatic perspective of the preferred embodiment according to the present invention, illustrating an outlet receptacle and a preferred method of providing a wiring system utilizing a plurality of outlet receptacles;

FIG. 2 is a fragmentary diagrammatic perspective of another preferred embodiment of a wiring system according to the present invention and further illustrating an outlet receptacle according to the present invention with parts thereof in exploded configuration further illustrating the details thereof;

FIG. 3 is an enlarged fragmentary perspective of a wiring device or fixture in the form of an outlet receptacle according to the present invention, with the details thereof being illustrated in exploded configuration, and further illustrating an enclosure box in the form of a mounting bracket with deformable portions for enlarging the profile of the bracket and receptacle;

FIG. 4 is a fragmentary diagrammatic view of the outlet receptacle according to the present invention in registration within a substrate opening;

FIG. 5 is a fragmentary diagrammatic view of the outlet receptacle shown in FIG. 4 with the deformable portions of the receptacle mounting bracket in outwardly projecting relationship enlarging the profile of the receptacle and for gripping the substrate to permanently mount the receptacle in registration therewith;

FIG. 6 is a fragmentary diagrammatic view illustrating the prong-receiving electrical contacts or electrical terminals of the outlet receptacle according to the present invention;

FIG. 7 is an elevation illustrating an outlet receptacle according to the present invention being mounted in a substrate wallboard opening;

FIG. 8 is an enlarged perspective of an electrical terminal according to the present invention adapted for insertion within the outlet receptacle according to the present invention, said electrical terminal having an insulation slicing type electrical contact and a pair of prong-receiving type electrical contacts;

FIG. 9 is an enlarged perspective of another preferred embodiment of an electrical terminal according to the present invention adapted for insertion within the outlet receptacle according to the present invention, said electrical terminal being provided with an insulation slicing type electrical contact and a spaced pair of prong-receiving type electrical contacts;

FIG. 10 is an enlarged plan view of the housing of an electrical outlet receptacle according to the present invention with a cover plate being removed to illustrate the interior details of the housing;

FIG. 13 is an enlarged perspective of an outlet receptacle housing according to the present invention together with a medial portion of a multi-conductor electrical cable and a cover plate for the receptacle housing in exploded configuration to further illustrate the details thereof;

FIG. 14 is an enlarged perspective of a preferred embodiment of a switch according to the present invention and further illustrating in exploded configuration, a housing, insulation slicing type electrical terminals mounted within the housing and a cover plate for cooperation with the housing;

FIG. 15 is a fragmentary perspective of a preferred embodiment of the switch according to the present invention illustrated as being connected electrically to a multiconductor electrical cable and provided with a metal enclosure box latchably securing the cover to the housing portion of the switch;

FIG. 16 is an enlarged fragmentary plan illustrating the individual electrical terminals of the switch according to the present invention electrically connected to the individual conductors of a multi-conductor electrical cable to provide an in-line switch;

FIG. 17 is a fragmentary plan of another preferred embodiment of a switch according to the present invention illustrating modified insulation slicing type electrical terminals electrically conducted to the individual conductors of a multi-conductor cable to provide a return-line switch;

FIG. 18 is a fragmentary plan of a modified switch according to the present invention illustrating preferred embodiments of different electrical terminals electrically connected to the individual conductors of a multi-conductor electrical cable to provide a two-way switch;

FIG. 19 is a fragmentary section taken along the line 19—19 of FIG. 16 illustrating the details of the switch operation; and FIG. 20 is an enlarged fragmentary section taken generally along the line 20—20 of FIG. 19.

Figure 11:
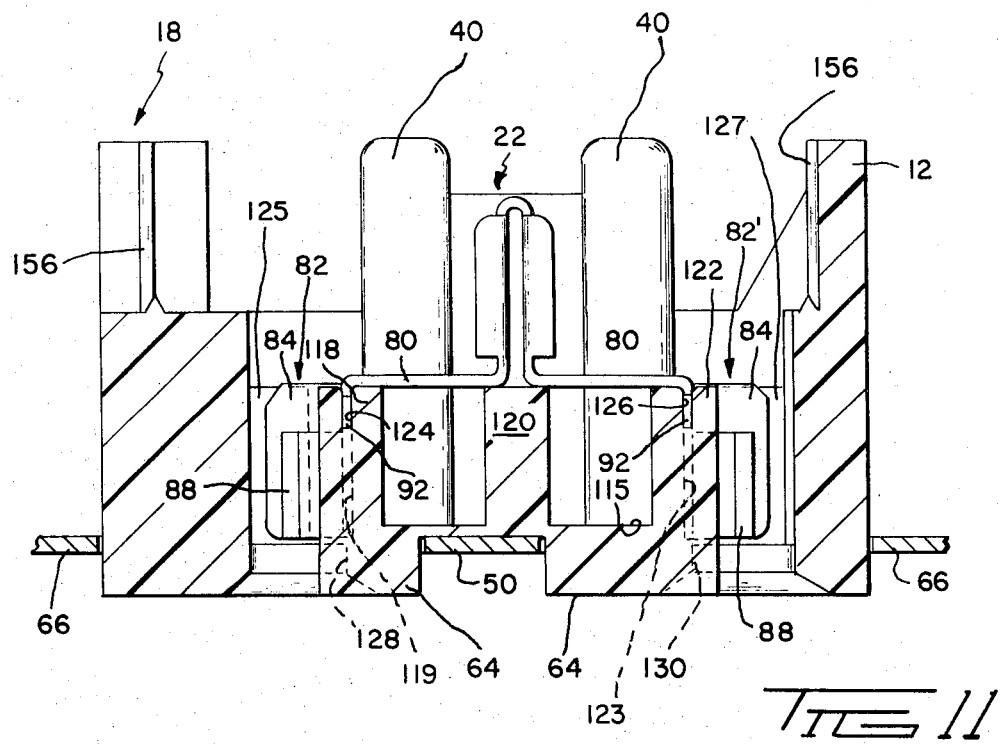
FIG. 11 is an enlarged section taken generally along the line 11—11 of FIG. 10 further illustrating the electrical terminal of FIG. 8 in place within the receptacle housing.

With more particular reference to the drawings, there is shown in FIG. 1 a fragmentary diagrammatic representation of a preferred embodiment of the wiring system according to the present invention. A plurality of upright elongated wall supporting members, or studs, two of which are shown at 1 are provided thereover with a substrate in the form of wallboards, one of which is shown at 2 having a plurality of generally rectangular openings therein, one of which openings is shown at 4. Together the uprights 1 and wallboards 2 are composite parts of a building wall erected on-site or factory pre-assembled in a building module. The plurality of openings 4 in the wallboard provide a plurality of locations for receiving electrical wiring devices or fixtures, such as switches or outlet receptacles, and may be located in spaced relationship with respect to the studs 1 as shown in the figure, or immediately adjacent to one of the studs, in correspondence with accepted wall construction techniques. As the figure illustrates only a diagrammatic representation, the spirit and scope of the present invention should not be limited to the specific structure shown but should be interpreted to apply to any of the accepted building wall constructions. With reference yet to the figure, there is shown generally at 6 a plurality of uninsulated and insulation covered electrical conductors of the three-wire type, collectively provided thereover with a common insulation layer to provide a multi-conductor electrical cable typically used in wiring systems for buildings, mobile homes and the like. The conductors 6 may alternatively be of the two-wire type. Alternatively, individual conductors may be substituted for the collectively insulated type specifically shown in the figure. Whatever alternative type of wiring is selected, the conductors 6 thereof are bridged continuously between point-to-point wall locations in the vicinity of the electrical wiring device or fixture receiving openings 4. The conductors 6 are also advantageously secured according to any well known fastening technique to selective studs 1. In a manner to be explained in detail, the conductors 6 are electrically connected at selected intervals along their lengths, to wiring devices or fixtures, such as receptacle outlets and switches, according to the present invention. The typical outlet receptacle according to the present invention is shown generally at 8. Each receptacle 8 is received in a corresponding aperture 4 thereby providing a wiring system. Each receptacle is then provided thereover with the usual aesthetic cover plate 10, with a stud 12 connecting the plate to the receptacle. In the embodiment shown in FIG. 1, each receptacle 8 is inserted into the corresponding wallboard aperture 4 through a reverse surface of the wallboard, with the cover plate 10 being located on the obverse surface of the wallboard.

With reference to FIG. 2, the present invention further includes an alternative embodiment wherein each outlet receptacle may be mounted through the obverse surface of the wallboard 2. Accordingly, with reference to FIG. 2, a building wall is provided as before with studs 1 and wallboards, one of which is shown at 2, mounted to the studs. Continuous lengths of uncut and unstripped conductors 6 are bridged between point-to-point locations defined by the plurality of openings 4 in the wallboards. According to the alternative embodiment, the conductors 6 include collective conductor loop portions, one of which is shown at 14, inserted through a corresponding opening 4. Medial portions 16 of the individual conductors 6 are electrically connected to respective electrical terminals in the corresponding receptacles 8, as will be explained in more detail hereinafter. As shown in FIG. 2, a representative receptacle 8 includes a housing 18 and a cover 20 therefor. The receptacle 8 is electrically connected to the conductor portions 16 and then inserted into the corresponding opening 4 from the obverse side of the wallboard 2. The loop portion 14 is removed from the opening 4 placed behind the reverse surface of the wallboard 2. The cover plate 10 is connected by the stud 12 to the receptacle 8 in order to cover the surrounding margins of the opening 4. Thus, the receptacle 8 according to the present invention may be mounted to the wallboard 2 by insertion from either the obverse or the reverse surface as desired.

With reference to FIG. 3, the connection of the conductor medial portions 16 to the receptacle 8 will be explained in greater detail. The housing 18 is shown with its cover plate 20 removed therefrom for illustration purposes thereby exposing plurality of insulation slicing terminals 22, of the type disclosed in U.S. Patent application, Ser. No. 84,286, filed Oct. 27, 1970. The housing 18 includes projecting outer sidewalls 24 and 26 on opposite sides of the terminals 22. A notch 28 is provided in the sidewall 24 with the bottom 30 of the notch providing a stress relieving bearing surface. A similar notch 32 is provided in the other sidewall 26 with the bottom wall 34 of the notch 32 providing another stress relieving bearing surface. The medial portions 16 of the conductors 6 are separated from one another and are electrically connected to the corresponding terminals 22. If the conductors are of the type having a collective insulation layer, as shown, the insulation may be first slit or sliced to allow separation of the conductors 6 according to the techniques disclosed in application Ser. No. 84,009, filed Oct. 26, 1970. The portions 36 and 38 of the cable 6 adjacent to the medial portions 16 are then received respectively in the notches 28 and 32. In addition, the conductor portions 36 and 38 are received respectively against the walls 30 and 34 which provide stress relief for the conductors. The cover 20 is then applied over the conductors 6 enclosing the medial portions 16 thereof within the housing 18. The housing 18 is provided with four projecting posts 40. The cover plate 20 includes corresponding apertures 42 receiving respective posts 40 therein. The housing 18 further includes a pair of diagonally inclined internal side surfaces 44 on opposite sides of the notch 28. The housing 20 includes external corresponding side surfaces 46 to be received in complementary adjacent relationship with respect to the surfaces 24 to insure proper alignment of the cover plate 20 with respect to the housing 18. The cover plate 20 is further provided with a pair of notches one of which is shown at 48 which are received respectively over the conductor portions 36 and 38, the notches 48 additionally cooperating respectively with the notches 28 and 32 to encircle the conductor portions 36 and 38.

The housing 18 is further provided with an enclosing and conductive enclosure box or mounting bracket 50, with a pair of gripping fingers 51 engaged on said housing 18 to form a unitary combination. The enclosure box or bracket includes a pair of spaced opposed projecting latching arms 52 each of which is provided with a generally rectangular aperture 54. The cover plate 20 is provided with projecting wedge-shaped latching tabs, one of which is shown at 56. When the cover plate 20 is connected to the housing 18, the wedge-shaped tabs 56 are latchingly received in corresponding apertures 54 preventing subsequent removal of the cover 20. The bracket 50 is additionally provided with integral flap portions 58 which are folded over to conform to the profile of corresponding external corners of the housing 18 as shown in FIG. 3. The free end of each folded flap is provided with a notch, one of which is shown at 60. That portion of each flap 58 which is integrally joined to the remainder of the bracket 50 is provided with an elongated slot 62. Sufficient bracket material is removed by provision of the slots 62 that structurally weakened bracket portions are provided for a purpose to be explained hereinafter.

With reference to FIGS. 2 and 3, taken in conjunction with FIGS. 4, 5 and 7, the relationship of the receptacle 8 with either the obverse or reverse surfaces of the substrate wallboard 2 will be explained in detail. Accordingly, FIGS. 2 and 3 particularly show the housing 18 having a pair of plug-in outlets 64 for receiving therein the well-known electrical plugs of an electrical appliance or machine. The mounting bracket 50 encircles each outlet 64 and is provided with opposed projecting apertured tabs 66. The tabs are coplanar and protrude laterally from the housing profile defined by the sidewalls 24 and 26. Each apertured tab 66 is disposed between a pair of spaced supporting arms 68 and 70 which project orthogonally of the respective tabs 66. The arms 68 additionally are coplanar and outwardly spaced from the housing profile defined by the sidewall 24. In similar fashion, the tabs 70 are coplanar and outwardly spaced from the housing profile defined by the sidewall 26. Adjacent each of the arms 68 and 70 the bracket is provided with a substantially chamfered or recessed margin portion 72.

With more particular reference to FIGS. 2 and 4, one preferred technique of installing the receptacle 8 within the wallboard 2 will be explained in detail. The conductors 6 are electrically connected to the receptacle 8 with the cover 20 thereof impressed on the housing 18 and suitably latched to the latching arms 52. The loop portion 14 is inserted through the opening 4 to a position hidden behind the wallboard 2 bracket arms 68 and 70 while the supporting arms 68 and 70 engage against opposed margins of the wallboard opening 4 as shown in FIG. 4. With the tabs 66 of the bracket in registration against the obverse face of the wallboard 2, the bracket may then be permanently attached by suitable fasteners secured to the tab 66 and the wallboard 2. According to an alternative technique for securing the receptacle 8 in place, reference will be made to FIGS. 3 and 5. As more particularly shown in FIG. 3, a prying tool 74 may be inserted in the clearance between the housing profile and the recessed margins 72 of the wallboard opening 4. The tip of the tool 74 is readily registered within the aperture 60 of the bracket flap portion 58. The flap 58 is then manually pried outwardly to a position as shown at 58' in FIGS. 3 and 5, in order to project outwardly beyond the original profile of the housing 18. Sufficient bracket mass is removed by provision of the slots 62 to weaken the bracket and allow deformation of the bracket in the vicinity of the slots 62, allowing the flaps 58 to be pried to their projecting configurations 58'.

As shown in FIGS. 3 and 5, the tabs 66 overlie the obverse surface of the substrate 2, and cooperate with the outwardly projecting flap portions 58' on the reverse face of the wallboard 2, to grip the wallboard and retain the receptacle 8 within the wallboard opening 4. The tabs 66 are adjacent to corresponding notch portions 75 which engage and grip the wallboard against the flanges 66. The notch portions are wedge-shaped to form inclined surfaces accommodating therein wallboards of different thicknesses. The inclined surfaces are thus automatically adjustable by the amount of outward movement required to receive therein wallboards of different thicknesses and for gripping thereby wallboards of different thicknesses.

With reference to FIGS. 1 and 7, an alternative method of mounting a receptacle within the wallboard opening 4 will be explained in detail. As shown in FIG. 7, one of the tabs 66, together with its corresponding supporting arms 68, is fully inserted into the wallboard opening 4 from the reverse surface of the wallboard 2. Since the supporting arms 68 project substantially beyond the receptacle profile defined by the sidewall 24, extra clearance is provided to permit full insertion through the wallboard opening 4 of the other tab 66 together with its supporting arms 70. Accordingly, the laterally projecting tabs 66 are freely insertable through the wallboard opening, enabling subsequent registration of the arms 68 and 70 against opposed margins of the wallboard opening 4 suitably to register the receptacle 8 in position as shown in FIGS. 4 and 5. The bracket flaps 58 may then be bent to their outwardly projecting configurations 58' as shown in FIG. 5 to grip the wallboard and to permanently retain the receptacle 8 in place. The clearance between the vertically opposed sidewalls 4 of the wallboard opening is approximately greater than the distance between the supporting arms 68 and 70, allowing the unitary combination of the enclosure box and wiring device to be oriented at an angle, as shown in FIG. 7, allowing the supporting arms to be freely inserted sequentially through the wallboard opening from the reverse surface of the wallboard. The clearance between the vertically opposed sides 4 of the wallboard opening is also of a dimension smaller than the vertical dimension of the enclosure box defined by the tabs 66. This allows the tabs 66 to overlie the obverse surface of the wallboard 2 when the unitary combination of the enclosure box and wiring device is correctly positioned within the wallboard opening as shown in FIG. 4. When properly positioned as shown in FIG. 4, the arms 68 and 70 will register in the space between the vertically opposed walls 4 of the wallboard opening to center the wiring device vertically in the opening. Thus at each corner of the rectangular wallboard opening, as shown in FIG. 5, a corresponding deformable bracket portion 58 is exposed to the side of the wallboard. As shown in FIG. 3, a suitable tool such as a screwdriver can be inserted through each corner of the wallboard opening from the obverse surface of the wallboard, to engage in the recess 60 of each deformable flap portion 58 and allow prying of each flap portion into adjustable outward displacement in engagement against the reverse surface of the wallboard, thereby fixedly mounting the box enclosure in the wallboard opening. The arms 68 and 70 thus correctly center the enclosure box vertically in the wallboard opening such that all the flap portions 58 are exposed and are accessible at the corresponding corners of the wallboard opening around the periphery of the enclosure box 50. Accordingly, the receptacle according to the present invention may be inserted within a wallboard opening from either the obverse or reverse side of the wallboard. The receptacle is provided with a bracket having deformable portions for enlarging the profile of the receptable in order to permanently mount the receptacle within the wallboard opening.

With more particular reference to FIG. 8, a particular electrical terminal for use with the outlet receptacle 8 will be described in detail. The terminal, generally indicated at 77, includes the insulation-slicing type electrical contact 22 heretofore described, and similar in construction to that disclosed in U.S. application Ser. No. 84,286, filed Oct. 27, 1970. Accordingly, the contact 22 includes vertical opposed pairs of cantilever beams 76 having insulation-slicing edges, and also vertical stiffening flanges 78. Each pair of cantilever beams 76 projects vertically from and is integral with one end of a horizontal elongated generally planar flange portion 80. At the other end of each flange portion 80 is provided an integral depending receptacle-type electrical contact indicated generally at 82 and 82'. Each contact 82 and 82' is defined by a generally vertical planar plate 84 parallel to but offset from the longitudinal axis of the respective integral flange portion 80. Each plate 84 includes a generally flared horizontal lip 86 in spaced relationship from the flange portion 80. The contacts 82 and 82' further are each provided with another vertical plate portion 88 deformed to a generally U-shaped configuration and having a generally vertical edge margin 90 opposing the planar surface of the plate portion 84. A vertical flange portion 92 is integral with each of the contacts 82 and 82' and projects laterally of the respective flange portion 80. During fabrication of the terminal 77, the contact 22 is stamped and formed integrally with the flange portions 80 and the contacts 82 and 82'. The blade portions 92 are originally formed as parts of the corresponding plate portions 88, the plate portions 88 subsequently being separated from the blade portions and formed to their U-shaped configurations.

With more particular reference to FIG. 9 of the drawings, another electrical terminal generally indicated at 94 for use in the receptacle 18 will be described in detail. The terminal 94 includes an insulation-slicing contact 22 having the vertical cantilever beams 76 and the stiffening flanges 78 similar in configuration to the terminal 77. The terminal further includes a pair of horizontal and oppositely projecting generally planar elongated flange portions 96 and 98, each of which flange portions includes a depending electrical prong-receiving type contact generally indicated at 100 and 100'.

Each of the contacts 100 and 100' includes a generally planar vertical plate 102 which is transverse with respect to the longitudinal axis of the respective flange portions 96 and 98. Each plate 102 includes a cantilever mounted, resilient lance 104 projecting therefrom. Each plate 102 includes a pair of vertical side margins 106 folded to form a generally U-shaped plate configuration. The flange portion 96 includes a pair of oppositely directed generally coplanar horizontal blades 108 adjacent to the terminal 100. In similar fashion, the flange portion 98 includes a pair of oppositely projecting coplanar horizontal blades, one of which is shown at 110, adjacent to the other contact 100'. A pair of vertical blades 111 are located adjacent to the contact 22 and the flange 98. In addition, the flange portion 96 includes a centrally located cantilever depending contact lance 112 generally of hook-shape configuration. The terminal 94 is advantageously stamped and formed from a single piece of conductive metal strip.

FIG. 10 illustrates an enlarged plan view of the interior details of the receptacle housing 18. The housing is provided with a first external vertical sidewall 114 bridged between the outer vertical sidewalls 24 and 26. Bridging between the sidewalls 114 and 116 are projecting land portions 118, 120 and 122. Land portions 118 and 122 are provided with lateral notches 124 and 126 respectively. As shown in FIG. 11, the terminal 77 is inserted between the sidewalls 114 and 116, with the horizontal flange portion 80 in registration on corresponding land portions 118, 120 and 122. In addition, the blade portions 92 wedgingly engage within vertical notches 124 and 126 respectively provided in the land portions 118 and 122. The insulation slicing contact is in registration on the land portion 120 and projects vertically therefrom. One of the contacts 82 is in registration against a vertical sidewall 119 of the land portion 118. The plate 84 is in registration against a vertical sidewall 121 of a vertically raised land portion 125. The flared edge margin 86 and the rounded corner 91 of the contact 82 are adjacent to the bottom wall 115 of the housing. The housing bottom wall is provided with a slot opening 128 in communication with the space between the flared edge margin 86 and the corner 91. Accordingly, the slot 128 is in communication with the space between the plate 84 and the edge 90 of the contact 82.

In similar fashion, the outer contact 82' of the terminal 77 is in registration against a vertical sidewall 123 of the land portion 122. The plate 84 of the contact 82' is in registration against a vertical wall 127 of a raised land portion 131. The housing bottom wall 115 is provided with a slot opening 130 in communication with the space between the flared edge margin 86 and the corner 91 of the contact 82'. The slot 130 is thereby in communication with the space between the plate 84 and the edge 90 of the contact 82'.

As shown in FIG. 10, portions 118', 120' and 122' are provided and are of similar configuration with respect to land portions 118, 120 and 122, respectively. Another terminal (not shown) is located between an outer vertical sidewall 114' and an inner vertical sidewall 116', with the blade portion 92 thereof in registration within the vertical notches 124' and 126' provided respectively in the land portions 118' and 122'. The insulation slicing contact 22 is in registration on the land portion 120' in similar fashion as described with the similar land portion 120. Also in similar fashion, the contact 82 registers against a vertical sidewall 119' of the land portion 118' and against the vertical sidewall 121' of the land portion 125, with the contact in communication with a slot opening 128' similar to the slot opening 128. Also in similar fashion, the contact 82' registers against the vertical sidewall 123' of the land portion 122' and the vertical sidewall 127' of the land portion 131 with the contact being in communication with a slot opening 130' similar to the slot opening 130.

In use, the slot openings 128 and 128' receive the prongs of an electric appliance or machine plug connected to the outlet 64. The slot openings 130 and 130' receive the prongs of another electric appliance or machine plug connected to the other outlet 64'. Each prong is wedgingly engaged between a plate 84 and the edge 90 of a corresponding contact 82 or 82', thereby being electrically connected to the corresponding terminal 77.

Figure 12:
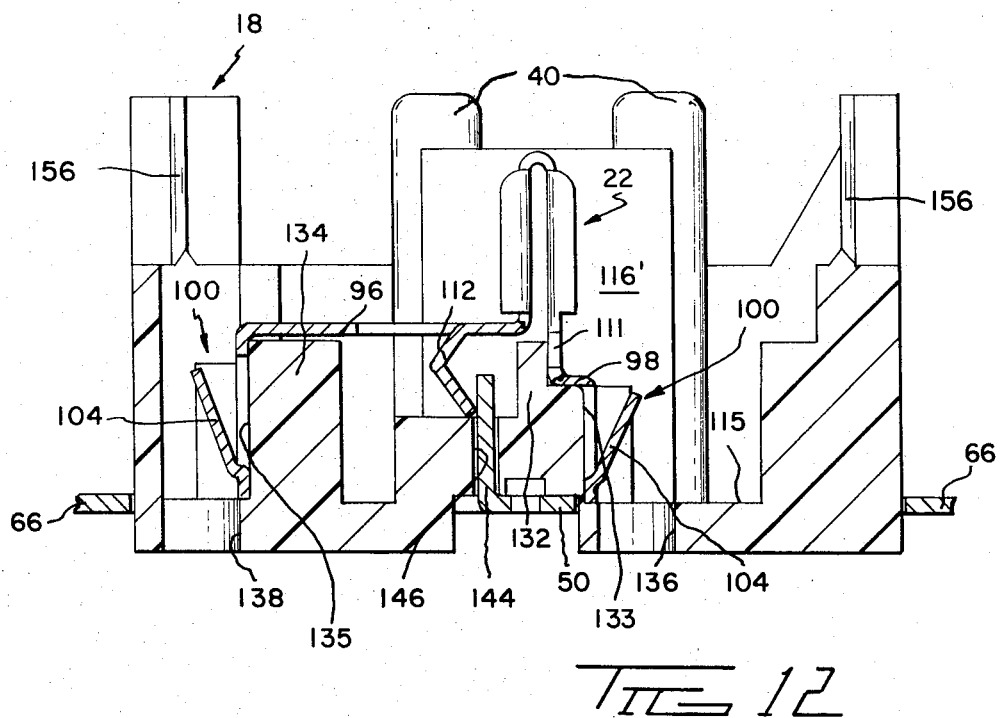
FIG. 12 is an enlarged section taken along the line 12—12 of FIG. 10 further illustrating the electrical terminal as shown in FIG. 9 in place within the receptacle housing.

With reference to FIG. 10 taken in conjunction with FIG. 12, the receptacle 18 is further provided with another terminal disposed between the vertical interior sidewalls 116 and 116'. A stepped vertical land portion 132 is disposed between the sidewalls 116 and 116'. The terminal 94 as shown in FIG. 9, is inserted with insulation slicing contact 22 in registration against the stepped land portion 132. The flange 98 is in horizontal registration on the lower portion of the stepped land portion 132. One of the electrical contacts 100 is located against the vertical sidewall 133 of the land portion 132 and is adjacent the bottom wall 115 of the housing 18. An aperture 136 is provided in the bottom wall 115 in communication with the contact 100 for receiving the grounding prong of a three prong appliance or machine plug. The flange portion 96 is in horizontal registration on the land portion 125 with the other prong-receiving contact 100' vertically against the vertical sidewall 135 of land portion 125 and adjacent to the bottom wall 115 of the housing 18. The housing bottom wall 115 is provided with an aperture 138 in communication with the contact 100' for receiving the grounding prong of a three-prong appliance or machine plug. As shown in FIG. 10, the land portion 125 is provided with a generally T-shaped horizontal recess 140.

The flange portion 96, together with the blades 108, are of complementary T-shaped configuration and wedgingly register horizontally within the T-shaped recess 140 to retain the terminal 94 in place within the receptacle housing 18. The housing interior sidewalls 116 and 116' are provided respectively with lateral aligned notches 140 and 142 for receiving a blade 111 therein. In addition, the blades 110, which are integral with the flange portion 98, register horizontally on the land portion 132 and wedgingly engage between the sidewalls 116 and 116', further retaining the terminal 94 in place within the housing. As shown in FIG. 12, taken in conjunction with FIG. 9, the terminal 94 includes the depending lances 112 in mechanical and electrical engagement with a tab portion 144 of the mounting bracket 50, which tab portion 144 is inserted through an opening 146 provided in the bottom wall of the housing between the sidewalls 116 and 116'. In operation, a two-prong appliance or machine electrical plug is inserted within the pair of apertures 128 and 128' or alternatively in the pair of apertures 130 and 130'. Each prong-receiving contact 82 or 82' receives a prong inserted between the plate portions 84 and 90 to make electrical contact with a corresponding terminal 77 and the conductor wire connected to the contact 22. If the electrical prong is a three-prong type, a third prong or grounding prong will be inserted within either of the apertures 138 or 136 to be engaged resiliently by the lance 104 of an electrical contact 100 or 100' thereby making electrical contact with the terminal 94 and a conductor wire electrically connected to the contact 22. In addition, the mounting bracket 50 will be electrically grounded to the terminal 94 because of the tab portion 144 engaging in electrical contact with the lance 112 of the terminal 94.

FIG. 13 more particularly illustrates the cover portion 20 provided with three projecting laterally spaced I-beams 146, 148 and 150. Each of the projecting I-beams portions engages one of the medial portions 16 of the conductors 6 and presses the medial portions into electrical and mechanical connection between the pairs of cantilever beams of corresponding electrical contacts 22. The central web of each I-beam longitudinally overlies and engages an individual conductor and freely enters the space between the contact flanges 76 of the corresponding contact 22 as the I-beam forces the individual conductors between the flanges 76. The central web of each I-beam remains engaged on an individual conductor as the cover plate becomes latched to the housing portion 18. Thus the medial portions 16 are connected to respective terminals 22 simultaneously upon receiving a cover plate in registration with the housing 18. Alternatively, the medial portions 16 may be separately connected to respective terminals 22 and the cover 20 subsequently placed in registration with the housing 18. In either alternative, the cover encases or encloses the medial portions within the outlet receptacle. With the medial portions 116 enclosed within the receptacle the projecting I-beam portions 146, 148 and 150 will be retained in engagement against the medial portions 16 to prevent their inadvertent removal from their respective terminals 22. If desired the cover 20 may include a first pair of protruding tabs 152 adapted for insertion adjacent to and within the housing sidewall 114. If desired the cover 20 additionally may be provided with an opposed pair of protruding tabs 154 which are relatively longer than the tabs 152 and which are adapted to be inserted within and adjacent to the opposing sidewalls 114' of the housing. The tabs however are optional and may be eliminated from the cover without effecting the operation thereof.

As shown more specifically in FIGS. 3 and 11–13, the housing includes a generally continuous U-shaped projecting ridge 156 internally of each of the notch openings 28 and 32. When, as shown in FIG. 3, the spread apart conductor portions 16 are placed internally of the housing 8, the unslitted cable portions 36 and 38 are received internally of the corresponding notch openings 28 and 32. In addition, the slitted portions of the cable on opposite sides of the central one of the spread apart conductors 16 will be received in encirclement over the posts 40 of the housing 8. The individual spread apart conductors 16 together with the slitted portions of the outer sheath will thus be received in partial encirclement around the posts 40. In this manner, the individual conductors 16 and associated slitted portions of the outer sheath will be received in alignment with corresponding terminals in the housing. The conductors are thus retained in the housing by the posts 40, and the cable portions 36 and 38 are retained in the corresponding notch openings 28 and 32. This not only insures that the conductors are properly aligned with respect to the corresponding electrical terminals, but also temporarily holds and retains the conductors in place on the housing and over the terminals allowing the operator to position the cover plate over the housing without inadvertently displacing the individual conductors 16 from their desired positions within the housing or requiring the operator to repeatedly check to insure proper location of the conductors 16 over the terminals in the housing. It is then a simple matter to press the cover into engagement with the individual conductors while the conductors are being retained in desired positions within the housing described. The posts 40 will then assure that the conductors together with the slitted portions of the outer sheath 6 are guided into electrical contact between the slicing edges of the corresponding electrical terminals as the cover plate is pressed into cooperation with the housing and then automatically latched to the latching portions 54 of the bracket. The terminals slice through the outer sheath 6 and the insulation on the conductors to effect electrical connection on the conductors. The unsliced portions 36 and 38 of the cable 6 will be partially received in the notch openings 48 of the cover 20 and will thus be completely encircled by the cover openings 48 and the notches 28 and 32 of the housing. The cable portions 36 and 38 will be compressibly encircled thereby to provide stress relieving of the cable at its entrance into the housing. In addition, the cable portions 36 and 38 are encircled and gripped by the cover and the protruding ridges 156 to anchor the cable to the housing and thus prevent pulling or tension on the cable 6 to be transmitted internally of the housing and cause separation of the conductors 16 from the contacts 22.

The housing 160 of the switch according to the present invention includes a pair of outer sidewalls 24' and 26'. A notch 28', or wire receiving opening, is provided in the sidewall 24', with a generally continuous U-shaped projecting ridge 156' internally of the notch 28 and providing a stress relieving bearing surface for the electrical cable to be received in the notch 28'. A similar notch 32' is provided in the sidewall 26' together with another stress relieving projecting ridge 156' of U-shaped configuration. A three conductor cable shown in FIG. 16 at 6, is sliced to allow separation of medial portions of the individual conductors 16 in a manner as heretofore described in conjunction with FIG. 3. Also as shown in FIG. 16, portions 36 and 38 of the cable adjacent to the medial portions 16 are then received in the notches 28' and 32'. The housing is provided with four projecting posts 40'. The medial portions 15 of the conductors are looped around the posts as shown in FIG. 3, insuring that the conductors are properly located over electrical terminals received in the housing. The terminals are located between the outer sidewalls 114' of the housing and two interior sidewalls 116'' adjacent to the posts 40'. The posts 40' and the notches 28' and 32' engage and retain the slitted portion of the cable and the associated spread apart individual conductors thereof in proper alignment within the housing, leaving an operator free to attach the cover 162 to the housing 160 without inadvertently displacing the conductors from alignment with the terminals and without a need for repeated inspection to assure such alignment. As shown, a portion of one of the cables is removed by snipping with a wire cutter prior to installation in the housing. As in the previous embodiment of the outlet receptacle, the switch includes insulation slicing terminals illustrated in FIG. 14 at 22a, 22b and 22c. The terminals include insulation slicing contacts 164 of the type described in U.S. patent application Ser. No. 279,612, filed Aug. 10, 1972 in the names of James Albert Kloth et al. Each of the terminals includes opposed slicing edges on a bulged web connecting cantilever uprights, with a notch between the slicing edges into which one of the conductors 16 is to be inserted. As shown in FIGS. 14 and 20 each contact 164 is integral with a flange portion 166. As shown in FIGS. 14, 16 and 20, the housing sidewalls are provided with seven pairs of aligned grooves 168, 170, 172, 174, 176 and 178, each pair for receiving a corresponding flange of a terminal therein. As shown in FIGS. 14 and 16, the terminal 22a has its two contacts 164 located above the pairs of grooves 172 and 178, with an elongated flange portion 182 connecting its two mounting flange portions 166 seated in the pairs of grooves 172 and 178. Another terminal 22b has its contact located above the pair of grooves 170, with a short flange 184 having a button contact 186 thereon being connected with its mounting flange portion 166 seated in the pair of grooves 170. Another terminal 22c has its contact 164 located above another pair of grooves 180, with a resilient spring action flange 188 being connected with its mounting flange portion 166 received in the pair of grooves 180. The flange portion 188 has a button contact 190 cooperating with the button contact 186. More specifically, the switch shown in FIGS. 14 and 16 is designed for the recognized "inline" type of installation on the cable 6. As shown in FIGS. 15 and 19 the switch includes a manually actuated lever 192 rotatably operating a shaft 194 mounted transversely in the housing and bridging between the channels defined by the housing sidewalls 114'' and 116''. The shaft has a cam 196 (FIG. 19) which biases the flange 188 away from the flange 184, thereby preventing contact between the button contacts 190 and 186. The switch is therefore in the "off" position, a portion of the conductor 16 being removed prior to installation in the housing to prevent the by-pass flow of current around the separated button contacts 190 and 186. To render the switch in the "on" mode of operation, the lever is manually actuated to pivot the cam 196 and allow the flange 188 to resiliently bias the button contact 190 into engagement with the button contact 186.

The assembly of the switch to the cable is accomplished as before described in conjunction with the outlet receptacle. More specifically, with the cable and individual conductors initially supported on the notches 28' and 32'in encircling engagement on the posts 40', the cover 162 is pressed against the conductors 16, the cover having projecting I-beams with end flanges 198 transverse to thin webs 200 connecting the flanges 198. The end flanges 198 press against the medial portions 16 of the individual conductors, forcing them into the notched portions of the corresponding contacts 164 and between the slicing edges of the contact. The webs 200 will enter the space between the slicing edges of the contacts to retain the individual conductors internally of the contacts. FIG. 14 shows the cover being provided with latching portions, one of which is shown at 56'. As shown in FIG. 15, the latching portions 56' will engage in corresponding recesses 54' of a metal enclosure box 50', thereby latching the cover to the housing. The cover is further provided with notches 48' which receive the unstripped portions 36 and 38 of the cable. The cover notches 48' cooperate with ridges in the housing notches 28' and 32' to encircle, bite and grip the cable portions 36 and 38 and anchor the cable to the housing. Tension forces on the cable are thus prevented from being transmitted internally of the housing and causing separation of the conductors 16 from the contacts 164.

As shown in FIG. 15, the enclosure box 50' is similar to the one 50 described in conjunction with the outlet receptacle. The following differences are noted, however. The apertured tabs 66 of the enclosure box 50 are replaced by spaced tabs 66' on the box 50'. The tabs 66' will bear against a wallboard surface in the same manner as do the tabs 66 upon installation of the switch in a wallboard opening. The pairs of arms 68 and 70 of the box enclosure 50 are replaced by single arms 68' and 70' on the box enclosure 50'. The arms 68' and 70' operate in the same manner as the pairs of arms 68 and 70 as described hereinbefore. Indented tabs 51' grip the housing 160, similar to the operation of the tabs 51. The enclosure box 50' includes a plurality of slots 62' which serve the same function as the slots 62 of the bracket 50. That is, the slots 62' provide a weakened area adjacent to flap portions 58', similar to the flap portions 58 of the bracket 50. Notches having inclined surfaces 75' are provided to grip wallboards of different thicknesses, depending upon the depths within the notches the wallboard thicknesses are received. The notches thereby operate in a manner similar to that of the notch portion 75 of the box 50. In addition, a tab portion 144' is provided on the enclosure box 50' for making electrical engagement and contact with a depending lance 112' (FIG. 14) provided on one of the terminals 22, thereby grounding the enclosure box 50' to the center one of the individual conductors 16. Each of the box enclosures 50 and 50' serves as a unitary combination with its respective electrical wiring device, namely the outlet receptacle and switch. Also, the enclosures 50 and 50' are interchangeable for use on either the switch or outlet receptacle merely by allowing either the switch lever 192 or the outlets 64 to protrude from the box enclosures 50 or 50'. The unitary combination of the enclosure box and wiring device or fixture thus replaces the need for a separate "outlet box" and wiring device required in the prior art wiring codes and regulations.

The switch described thus far is an "in-line" type. With some modifications, the housing 160 may also be used as a "return-line" type switch or a "three-way" type switch. FIGS. 17 and 23 together illustrate a "return-line" type switch. FIG. 23 illustrates a terminal modification 22d wherein a single one of the insulation slicing type contacts 164, heretofore described, is located adjacent to a mounting flange 166 of the type described. The modified terminal also includes a second mounting flange 166 connected to the first flange 166 by an elongated bridging portion 202. An integral depending flange 204 is provided adjacent each mounting flange 166 with button contacts 206 and 208 respectively thereon. As shown in FIG. 17, the terminal 22d is located in the housing with the mounting flanges 166 thereof seated in the pairs of grooves 168 and 170. The terminal 22c is utilized as before in the embodiment of FIG. 14, namely with its mounting flange 166 seated in the pair of grooves 180. A terminal 22e (FIG. 21) includes a pair of mounting flanges 166 connected by a portion 210. The flanges 166 are seated respectively in the pairs of grooves 172 and 178. A single contact 164 is located above the pair of grooves 172. A tab 112" depends from one of the flanges 166 for grounding connection to the tab 144' of the enclosure box 50'. The individual conductors 16 are cut to length, after being spread apart, for termination to the respective terminals 22b, 22c and 22d. In operation, the current path will be carried from one conductor 16 to the other conductor 16 through the terminals 22d and 22c. Operation of the cam 196 as described heretofore will place the switch in the "off" mode by resiliently biasing the flange 188 away from button contact 208 of the flange 204 of ther terminal 22d.

FIGS. 18 and 22 illustrate the housing utilized as a "three-way" type switch. The terminal 22a is utilized as in the embodiment of FIG. 14, with the mounting flanges 166 seated in the pairs of grooves 172 and 178. Two terminals 22c are used. One of the terminals 22c is located with its mounting flange 166 in the pair of grooves 176. The other of the terminals 22c is located with its mounting flange 166 in the pair of grooves 180. Another modified terminal 22f is shown in FIG. 22. The terminals 22f is similar to the terminal 22d, with like parts illustrated with like numerals. Thus, the terminal 22f has mounting flanges 166 seated respectively in the pairs of grooves 168 and 170. As shown in FIG. 18, the conductors 16 are spread apart. Then portions of selected ones of the conductors are removed, for example, by cutting with wire cutters. The conductors are then electrically connected to the contacts 64 of the terminals 22a, 22c and 22f by attaching the cover plate as described. Terminal 22f conducts current from one outer conductor 16 to the outer conductor 16 unless, by operation of the switch cam 196 resiliently biasing the flange 188 of one of the terminals 22c, as described, the circuit is interrupted in the well known "three-way" mode of switch operation.

According to the present invention, the longitudinally sliced portions of the cable outer sheath are not removed prior to terminating the individual conductors in the electrical devices. Instead, some of the sliced portions of the cable outer sheath are spread apart together with the individual insulation covered conductors 16, as shown more particularly in FIG. 3. Thus, the sliced portions of the cable sheath remain in covering relationship over the individual insulation covered conductors and the central uninsulated conductor, even though such conductors are exposed through the outer sheath due to the sheath being sliced longitudinally and portions of the sheath being spread apart. The tool described in U.S. patent application Ser. No. 232,595, filed Mar. 7, 1972, is advantageously used to slice the outer sheath and simultaneously spread apart the individual conductors together with the sliced portions of the outer sheath. The tool further positions the spread apart conductors and sliced portions of the sheath to precisely lie within the wire receiving channels of the outlet receptacle, switch or other suitable wiring device, with the spread apart portions of the conductors being positioned so as to loop around the projecting posts 40 and 40' of the outlet receptacle or switch. Since the individual conductors of the cable normally used in wiring systems are relatively stiff, the wires remain in their spread apart and loop conditions as shaped by the above-identified tool. Since the individual conductors are positioned in spread apart positions, the need for an operator to lace the individual conductors in positions in the outlet receptacle or switch is eliminated. The stiffness inherent in the individual conductors assure that they will remain in place when they are shaped by the tool to their spaced apart positions. Upon termination to the individual contacts 22 and 164, said contacts will slice through the insulation on the individual spread apart conductors and also through the portions of the outer sheath covering the spread apart insulation covered conductors 16 and the uninsulated central conductor 16. The contacts 22 and 164 include bulged web portions which stiffen the contacts and prevent buckling thereof as the contacts are forced to slice through both the outer sheath portions and the insulation which covers the individual conductors, as the individual conductors are forcibly inserted between the slicing edges of the contacts.

The strain relief provided by the cooperating cover and ridges in the housing cable openings will bite and grip the cable at its entrance into the housing, thus anchoring the cable to the housing and preventing transmission of tension forces along the cable interiorly of the housing which would separate the cable from the electrical terminals.

The enclosure box is designed for removal from the wallboard opening after installation therein. A screwdriver or other suitable tool is inserted into the wallboard opening from the obverse surface thereof to pry the flap portions 58 or 58' into displacement back to the original profile of the enclosure box. The unitary combination of the enclosure box and wiring device 8 or 160 is then removable from the wallboard opening for inspection, repair or replacement. The cover 20 or 162 is removable from the appropriate wiring device by prying away the enclosure box holding the cover in assembled relationship. In practice it has been discovered that the wiring device if faulty can be replaced with a new or repaired wiring device terminated to the individual conductors which are already spread apart and otherwise treated for termination with the replacement wiring device. Thus the replacement wiring device may be terminated at the same location on the individual conductors without having to prepare or treat the individual conductors prior to installation of the replacement wiring device. In practice, it was observed that the individual conductors and the insulation thereover were only slightly nicked after repeated termination with replacement wiring devices. Since the damage to the conductors and insulation was slight, and since the conductors were only spread apart and not wrapped or coiled or even severed at the locations of the electrical connections thereto, the individual conductors were repeatedly terminated to replacement wiring devices without degrading significantly the electrical connections obtained thereby.

Although preferred embodiments and modifications of the present invention have been shown and described in detail, other embodiments and modifications of the present invention are intended to be covered in the spirit and scope of the appended claims, wherein:

What is claimed is:

1. A method for installing an electrical wiring device to a multi-conductor electrical cable comprising the steps of:

slicing through an outer sheath provided on the multi-conductor electrical cable thereby providing a sliced portion of said outer sheath, exposing medial portions of individual insulation covered conductors contained in said sliced portion of said outer sheath, spreading apart the exposed medial portions of said individual conductors while still contained within said sliced portion of said outer sheath, placing the spread apart medial portions still contained within said sliced portion of said outer sheath in a housing of said electrical wiring device, retaining the spread apart medial portions in desired locations with respect to said housing by engaging selected ones of the individual conductors with projecting portions of said housing, locating electrical terminals of the conductor gripping type in said housing and under said spread apart medial portions of said conductors, applying a removable cover over said medial portions of said individual conductors which are still contained within said sliced portion of said outer sheath, forcibly urging said cover toward said housing pressing said individual conductors into said housing and into electrical contact and mechanical gripping contact with said electrical terminals in said housing while penetrating said electrical terminals through the sliced portion of said outer sheath and through the insulation of said insulation covered conductors to establish electrical contact with said conductors, securing said cover in mounted relationship on said housing, and maintaining at least portions of said cover pressed on said medial portions of the individual conductors which remain contained within said sliced portion of said outer sheath, thereby maintaining said individual conductors in electrical contact and mechanical gripping engagement with said electrical terminals.

2. The method as recited in claim 1, and further including the steps of:

providing an enclosure in encirclement around said electrical wiring device, and releasably latching said cover to said enclosure, thereby securing said cover in mounted position on said housing and yet allowing removal of said cover from said housing and from pressed engagement of said conductors.

3. The method as recited in claim 2, wherein said enclosure is electrically conductive, and further including the step of:

mechanically and electrically contacting said enclosure with a selected one of said electrical terminals internally of said housing, thereby electrically grounding said enclosure to said selected one of said electrical terminals.

4. In the combination of a multi-conductor electrical cable having the individual conductors thereof terminated in an electrical wiring device having a housing and a separable cover of insulation material and a releasable means for retaining the housing and cover in assembled relationship, the improvement comprising: longitudinally sliced portions of an outer sheath of said cable, medial portions of the individual conductors of said cable being exposed through said longitudinally sliced portions of the outer sheath of said cable, the medial portions of the individual conductors being spread apart together with said longitudinally sliced portions of said outer sheath remaining on said individual conductors, cable receiving openings in opposite sides of said housing receiving unsliced portions of said electrical cable, said housing internally receiving the spread apart medial portions of the individual conductors together with the spread apart longitudinally sliced portions of said outer sheath, electrical terminals in said housing projecting portions of said housing located between said wire receiving openings and initially retaining said spread apart medial portions of the individual conductors in desired overlying positions with respect to said electrical terminals prior to and after assembly of said separable cover to said housing, said unsliced portions of said electrical cable outer sheath being on either side of said exposed medial portions of said individual conductors and being received and retained in said cable receiving openings prior to an after assembly of said separable cover to said housing, said separable cover including portions protruding toward said spread apart medial portions of the individual conductors and forcibly urging said medial portions of the individual conductors together with the spread apart longitudinally sliced portions of said outer sheath into engagement with said electrical terminals with said individual conductors being forcibly urged into electrical termination with said electrical terminals, and said releasable means releasably retaining said housing and said separable cover in assembled relationship, thereby enclosing said spread apart medial portions of the individual conductors internally of said electrical wiring device.

5. The structure as recited in claim 4 wherein said cable outer sheath includes longitudinally slitted portions exposing the medial portions of said individual conductors therethrough, said slitted portions of said outer sheath being retained generally in overlying relationship with respect to said exposed medial portions of said individual conductors and further being spread apart together with said medial portions of the individual conductors thereby defining said spread apart longitudinally sliced portions of said outer sheath.

6. The structure as recited in claim 4, wherein said cover cooperates with said housing to encircle and compressibly grip the unsliced portions of said outer sheath received in said cable receiving openings of said housing whereby said cable is anchored to said housing and said cooperating cover.

7. The structure as recited in claim 4 wherein said releasable means is electrically conductive in the form of an enclosure encircling and affixed to said housing and forming a unitary combination of an enclosure and a wiring device, the enclosure in mechanical and electrical engagement with a selected electrical terminal for electrical grounding thereto, and said enclosure releasably latching said cover in assembled relationship with said housing.

8. The structure as recited in claim 7, wherein said enclosure includes an integral mounting bracket portion for mounting said electrical wiring device removably within an opening provided in a wallboard.

9. The structure as recited in claim 8, wherein said mounting bracket portion includes protruding tabs and displaceable portions in spaced relationship with respect to said tabs, said tabs and said displaceable portions being adapted for receiving and gripping a wallboard therebetween.

10. In a method for the assembly of a multiconductor electrical cable having the individual conductors thereof terminated in an electrical wiring device of the type having a housing and a separable cover of insulation material and a releasable means to retain the housing and cover in assembled relationship, the steps comprising: exposing medial portions of the individual conductors through an outer sheath of said cable by slicing the outer sheath longitudinally to provide sliced portions of the outer sheath through which the individual conductors are visible, spreading apart the exposed medial portions of the individual conductors together with the sliced portions of said outer sheath remaining over said individual conductors, providing cable receiving openings in opposite sides of said housing for receiving said electrical cable, receiving the spread apart medial portions of the individual conductors and the sliced portions of said outer sheath in said housing, said electrical cable adjacent said exposed medial portions of said individual conductors being initially received by said cable receiving openings so as to retain fixedly said electrical cable in position on said housing prior to assembly of said cover thereto, providing electrical contacts internally of said housing, providing projecting portions on said housing, looping the exposed medial portions of the individual conductors around said projecting portions and thereby fixedly retaining said spread apart medial portions of the individual conductors in desired positions over the electrical contacts contained in said housing prior to assembly of said cover to said housing, assembling said cover over said exposed medial portions of said individual conductors, compressibly urging said cover against said individual conductors thereby force-fitting said individual conductors between the slicing edges of corresponding electrical contacts, said conductors thereby being electrically engaged on opposed sides thereof by the slicing edges of the corresponding electrical contacts, latchably securing said cover to said housing, maintaining said latchably secured cover in compressible overlying relationship against the medial portions of the individual conductors, thereby maintaining the individual conductors in force-fitted relationship between the slicing edges of the corresponding electrical contacts and thereby enclosing said individual conductors internally of said housing, and compressibly encircling said electrical cable by said cover and said cable receiving openings cooperating for encircably gripping said electrical cable to anchor the cable to the housing and to provide a cable strain relief.

11. In an electrical wiring device of the type including a housing, a separable cover, an enclosure having a bracket encircling said housing, a multi-conductor cable receiving opening provided in said housing and electrical terminals provided in said housing electrically terminated to individual conductors of the multi-conductor cable, the improvement comprising: latching means on said bracket for securing said separable cover in mounted position on said housing, a first portion of said bracket being laterally extensible beyond the profile of said housing for engagement on a first surface of a wallboard, second portions on said bracket being displaceable into engagement against a second surface of the wallboard, thereby gripping the wallboard across its thickness by the first and second portions of said bracket, said second portions of said bracket being exposed through openings provided in said bracket for allowing adjustable displacement of said bracket second portions into engagement against said wallboard second surface upon inserting a displacement producing tool through the openings provided in said bracket and forcibly displacing said bracket second portions with said tool.

12. The structure as recited in claim 11, wherein, said bracket further includes a tab portion extending internally of said electrical wiring device and in contact with a selected electrical terminal in said housing, thereby electrically grounding said bracket to one of the individual conductors electrically terminated in said selected electrical terminal.

13. The structure as recited in claim 11, wherein said second adjustable portion of said bracket includes a plurality of laterally outwardly displaceable portions on said bracket, each having an inclined surface in spaced opposed relationship with respect to the first portion of said bracket, said inclined surfaces each being displaceable adjustably into engagement against the wallboard second surface, whereby said adjustable outwardly portions are adjustably displaceable for gripping wallboards of various thicknesses.

14. The structure as recited in claim 11, and further including: flange means adjacent the first portion of said bracket for registration within the opening provided in the wallboard and for locating said electrical wiring device in registration within the opening of said wallboard.

15. The structure as recited in claim 11, wherein, said laterally outwardly adjustable portions of said bracket are defined by corresponding deformable portions on said bracket, said adjustable second portions of said bracket being adjustably displaceable by the degree of deformation imparted to said deformable portions of said bracket.

16. In the combination of an electrical wiring device having a housing, electrical terminals in the housing for electrical connection to individual conductors of a multi-conductor electrical cable, a separable cover engaging the individual conductors and urging the individual conductors into electrical connection with the electrical terminals, the cover further enclosing the individual conductors internally of the housing, a bracket encircling the housing and latching the cover in mounted position on the housing, the improvement comprising: said bracket being fully insertable within an aperture provided in a wallboard, the bracket having portions displaceable outwardly to enlarge the profile of the wiring device, said displaceable portions being deformable outwardly to grip the wallboard, said displaceable portions being adjustably displaceable into engagement against said wallboard for gripping the wallboard across its thickness and whereby said electrical wiring device is mounted within the wallboard opening, said deformable portions being disengageable from gripping relationship on said wallboard by subsequent displacement thereof toward a reduction in the profile from its enlarged profile configuration to permit disengagement of the deformable portions from gripping engagement with the wallboard and to permit removal of the electrical wiring device from the wallboard opening.

17. In the method for installing a wiring device and enclosure box within an opening provided in a wallboard, said enclosure box being affixed to said wiring device prior to termination of said wiring device to a multi-conductor electrical cable, the steps comprising:
placing unsevered lengths of the individual conductors of the multi-conductor electrical cable over a plurality of terminals fixedly mounted in the interior of said wiring device,
applying a separable cover over said individual conductors,
forcibly pressing said cover against the individual conductors and urging the conductors into electrical and mechanical gripped engagement with said electrical terminals thereby terminating said individual conductors to said electrical terminals,
removably latching said cover to said housing by latching portions provided on said box enclosure and removably engaging said cover,
mounting said unitary combination of said wiring device and said box enclosure within an opening provided in a wallboard,
electrically grounding said enclosure box to one of said electrical terminals by providing a tab portion on said box enclosure extending into said housing and in contact with said one electrical conductor,
providing an integral mounting bracket portion on said enclosure box for mounting said unitary combination of said enclosure box and said wiring device in said wall-board opening subsequent to termination of said wiring device to said multi-conductor electrical cable,
and adjustably urging said mounting bracket portion into gripping engagement across the thickness of said wallboard, thereby mounting said unitary combination of said enclosure box and said wiring device in said wallboard opening.

18. A method for installing an electrical wiring device to a multi-conductor electrical cable, comprising the steps of:
slicing through an outer sheath provided on the multi-conductor electrical cable thereby providing a sliced portion of said outer sheath,
exposing medial portions of individual conductors at said sliced portion of said outer sheath, spreading apart the exposed medial portions of said individual conductors, placing the spread apart medial portions in a housing of said electrical wiring device, retaining the spread apart medial portions in desired locations with respect to said housing by engaging selected ones of the individual conductors with projecting portions of said housing, locating electrical terminals of the conductor gripping type in said housing, applying a removable cover initially in engagement against said medial portions of said individual conductors, forcibly pressing said individual conductors into said housing and into electrical contact and mechanical gripping contact with said electrical terminals in said housing, securing said cover in mounted relationship with said housing, maintaining at least portions of said cover in engagement on said medial portions of the individual conductors, thereby maintaining said individual conductors in electrical contact and mechanical gripping engagement with said electrical terminals, providing an enclosure in encirclement around said electrical wiring device, latching said cover to said enclosure, thereby securing said cover in mounted position on said housing, inserting said electrical wiring device together with the enclosure thereof internaly within an opening provided in a wallboard, engaging first portions of said enclosure against an obverse surface of the wallboard, adjustably displacing second portions of said enclosure into engagement with a reverse surface of said wallboard, thereby adjusting said first and second portions of said enclosure into gripping engagement across the thickness of said wallboard, whereby said electrical wiring device and the enclosure thereof are mounted together as a unitary combination internally of the opening provided in said wallboard.

19. The method as recited in claim 18, wherein said enclosure second portions are deformable, and further including the steps of:

deforming said enclosure second portions to displace said enclosure second portions outwardly beyond the profile of said enclosure, thereby expanding the profile of said enclosure, and engaging said enclosure second portions against the reverse surface of said wallboard.

20. The method as recited in claim 19 wherein said enclosure second portions are spaced about the periphery of said enclosure, said enclosure includes positioning means for positioning said enclosure in said wallboard opening, and further including the steps of: positioning said enclosure within said wallboard opening to expose at said wallboard opening said enclosure second portions about the periphery of said enclosure, inserting a tool selectively into said wallboard opening about the periphery of said enclosure, and prying said enclosure second portions toward outward displacement beyond the profile of said enclosure and into engagement with said wallboard reverse surface.

21. The method as recited in claim 20 wherein said enclosure second portions include wedge-shaped notches and further including the step of: receiving the margins of said wallboard encircling the wallboard opening into said wedgeshaped notches upon outward displacement of said enclosure second portions into engagement on the reverse surface of said wallboard.

22. In the combination of a multi-conductor electrical cable having the individual conductors thereof terminated in an electrical wiring device having a housing and a separable cover of insulation material and a releasable means for retaining the housing and cover in assembled relationship, the improvement comprising:

longitudinally sliced portions of an outer sheath of said cable, medial portions of the individual conductors of said cable being exposed through said longitudinally sliced portions of the outer sheath of said cable, the medial portions of the individual conductors being spread apart together with said longitudinally sliced portions of an outer sheath remaining on said individual conductor, cable receiving openings in opposite sides of said housing receiving unsliced portions of said electrical cable, said housing internally receiving the spread apart medial portions of the individual conductors together with the spread apart longitudinally sliced portions of said outer sheath, electrical terminals in said housing, projecting portions of said housing located between said wiring receiving openings and initially retaining said spread apart medial portions of the individual conductors in desired or aligned positions with respect to said electrical terminals prior to and after assembly of said separable cover to said housing, said unsliced portions of said electrical cable outer sheath being on either side of said exposed medial portions of said individual conductors and being received and retained in said cable receiving opening prior to and after assembly of said separable cover to said housing, said separable cover including portions protruding toward said spread apart medial portions of the individual conductors and forcibly urging said medial portions of the individual conductors together with the spread apart longitudinally sliced portions of said outer sheath into engagement with said electrical terminals, with said individual conductors being forcibly urged into electrical termination with said electrical terminals, said releasable means releasably retaining said housing and said separable cover in assembled relationship, thereby enclosing said spread apart medial portions of the individual conductors internally of said electrical wiring device, said releasable means including a mounting bracket portion integral with said releasable means for mounting said electrical wiring device to a wallboard.

23. In the unitary combination of an electrical wiring device and an enclosure box affixed to said wiring device, the combination being adapted for mounting on a wallboard, the combination comprising:

a housing of insulation material provided with wire receiving openings at opposite ends of said housing, said enclosure box being affixed to said housing, said housing having an interior exposed through one side of said housing between said wire receiving openings, a separable cover of insulation material for covering one side of said housing, a plurality of electrical terminals of the insulation slicing and wire gripping type premounted in stationary positions within the interior of said housing and having electrical conductor receiving openings of said electrical terminals oriented toward said exposed one side of said housing whereby plurality of unsevered lengths of electrical conductors may be placed across the interior of said housing from one wire receiving opening to the other and over the conductor receiving openings of said electrical terminals and forcibly inserted into the conductor receiving openings of said electrical terminals for electrical and mechanical gripped engagement with said electrical terminals, said enclosure box including integral mounting means thereon for releasable gripping engagement on a wallboard to mount said unitary combination removably in an opening in the wallboard.

24. The structure as recited in claim 23, wherein, said mounting means includes first and second tab portions projecting from said enclosure box for engagement on an obverse surface of said wallboard of a wallboard, the formable portions integral with said enclosure box for deformation outwardly from said enclosure box into engagement on a reverse surface of a wallboard permitting releasable gripping engagement across the thickness of a wallboard by said tab portions and said deformable portions.

25. The structure as recited in claim 24, wherein, said tab portions are provided with projecting arm portions for registration within an opening of a wallboard with said tab portions and said deformable portions being in gripped engagement across the thickness of a wallboard.

* * * * *

PO-1050
(5/69)

UNITED STATES PATENT OFFICE
CERTIFICATE OF CORRECTION

Patent No. 3,860,739        Dated January 14, 1975

Inventor(s) JAMES ALBERT KLOTH; STUART L. PARSONS; JOHN AARON
Ã ZIMMERMAN; and GEORGE HENRY VIGEANT, deceased It is certified that error appears in the above-identified patent and that said Letters Patent are hereby corrected as shown below:

Column 23,

Claim 13, line 48, after the word "adjustable" delete the word --outwardly--.

Claim 13, line 49, after "adjustably" insert the word ---outwardly---.

Signed and Sealed this

Tenth Day of August 1976

[SEAL]

*Attest:*

RUTH C. MASON
*Attesting Officer*

C. MARSHALL DANN
*Commissioner of Patents and Trademarks*